(12) United States Patent
Mizuno et al.

(10) Patent No.: US 6,920,102 B2
(45) Date of Patent: Jul. 19, 2005

(54) CONVERGING ELEMENT, OPTICAL HEAD, AND APPARATUS AND METHOD OF OPTICALLY RECORDING AND REPRODUCING INFORMATION

(75) Inventors: Sadao Mizuno, Ibaraki (JP); Hiroaki Yamamoto, Kawabe-gun (JP); Hideki Hayashi, Nara (JP); Jouji Anzai, Suita (JP); Tomotada Kamei, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/694,899

(22) Filed: Oct. 29, 2003

(65) Prior Publication Data

US 2004/0085875 A1 May 6, 2004

Related U.S. Application Data

(62) Division of application No. 09/700,343, filed as application No. PCT/JP00/01525 on Mar. 14, 2000.

(30) Foreign Application Priority Data

| Mar. 15, 1999 | (JP) | 11-68457 |
| Apr. 27, 1999 | (JP) | 11-119445 |
| May 10, 1999 | (JP) | 11-128196 |
| May 31, 1999 | (JP) | 11-151886 |
| May 31, 1999 | (JP) | 11-151891 |

(51) Int. Cl.$^7$ ............................................. G11B 7/00
(52) U.S. Cl. ........................... 369/112.01; 369/112.23
(58) Field of Search .................... 369/112.01, 112.02, 369/94, 112.08, 112.13, 112.2, 112.22, 112.23

(56) References Cited

U.S. PATENT DOCUMENTS

| 5,822,135 A | 10/1998 | Lee et al. |
| 5,883,873 A | 3/1999 | Morita |
| 5,889,748 A | 3/1999 | Shimano et al. |
| 5,978,346 A | 11/1999 | Mizuno et al. |
| 6,400,670 B1 | 6/2002 | Dang |

FOREIGN PATENT DOCUMENTS

| EP | 0 818 781 | 1/1998 |
| EP | 0 838 812 | 4/1998 |
| EP | 0 859 356 | 8/1998 |
| EP | 0 865 037 | 9/1998 |
| JP | 7-065407 | 3/1995 |
| JP | 10-026726 | 1/1998 |
| JP | 10-124912 | 5/1998 |
| JP | 10-214431 | 8/1998 |
| JP | 10-275355 | 10/1998 |
| JP | 11-002759 | 1/1999 |

Primary Examiner—Nabil Hindi
(74) Attorney, Agent, or Firm—Wenderoth, Lind & Ponack, L.L.P.

(57) ABSTRACT

An optical head reproduces optical disks of different disk plate thickness t1 (0.6 mm) or t2 (1.2 mm) by using light beams of two wavelengths and one object lens. An converging element comprises a central portion and outer portion, wherein the central portion has optimum design plate thickness of 0.6*t1 to t1 and the outer portion has optimum design plate thickness of 0.6 mm. By providing a step difference in the converging element, information can be recorded or reproduced for an information medium of disk plate thickness t1 and for an information medium of disk plate thickness t2, in a state having small side lobes. Alternatively, a step difference is provided in the object lens, and optical distance L2 from a second light source to a condensing optical system is set to 80 to 95% of optical distance L1 from a first light source to the condensing optical system. Alternatively, only light of first wavelength is shielded or diffracted in a ring-like shape.

26 Claims, 34 Drawing Sheets

CONVERGING ELEMENT, OPTICAL HEAD, AND APPARATUS AND METHOD OF OPTICALLY RECORDING AND REPRODUCING INFORMATION

This is a Divisional Application of U.S. application Ser. No. 09/700,343, filed Nov. 14, 2000, which is the National Stage of International Application No. PCT/JP00/01525, filed Mar. 14. 2000.

TECHNICAL FIELD

The invention relates to an optical head and an apparatus for optically recording and reproducing information to and from an optical information recording medium.

BACKGROUND ART

An optical memory technology which uses an optical disk having pit-like pattern as a storage medium of high density and high capacity have been expanding its applications as a digital audio disk, a video disk, a document file disk, a data file, and the like. In the optical memory technology, information is recorded and reproduced to and from an optical disk with a light beam narrowed to a very small size with high precision and high reliability. The recording and reproducing operation mainly depends on the optical system thereof.

An optical head is a main component in the optical system, and its basic functions are divided into convergence for forming a very small light spot of diffraction limit, focus and tracking control of the optical system, and detection of pit signals. These functions are realized by combining a various optical system and a various detection technique with photoelectric conversion, according to an object and a use thereof.

An object lens used in an optical head is designed by considering plate thickness of optical disk. Its convergence performance is deteriorated due to spherical aberration for an optical disk having thickness different from the design value, and this makes recording and reproduction difficult. Previously, a compact disc (hereinafter referred to as CD), a video disk, a magneto-optical disk and the like all has plate thickness of 1.2 mm, and one optical head can be used for recording and reproduction for these various optical disks.

Recently, an optical disk of high density and high capacity, called as DVD (digital video disk), have been used practically, and it is high-lighted as an information medium which can handle a large amount of information such as a dynamic image. The DVD has smaller pit size in an information recording plane in order to increase recording density, relative to the prior art optical disk, CD. Therefore, for an optical head used for recording and reproduction of DVD, wavelength of light source and numerical aperture (hereinafter referred to also as NA) of converging lens which determine the spot size are different from the counterparts for CD. In order to increase recording density, DVD adopts large numerical aperture of object lens. When numerical aperture is increased, optical resolution is improved and recording density is increased. On the other hand, the converged light spot has coma aberration caused by inclination of optical disk. Then, in order to decrease the influence of coma aberration even when the numerical aperture of the object lens is increased, the thickness of the plate of the optical disk, DVD, is decreased to 0.6 mm. However, when the thickness of the plate of the optical disk is decreased, an object lens used for the optical disk cannot be used for a prior art disk, and the compatibility between DVD and the prior art disk cannot be realized.

It is to be noted that for CD the wavelength of light source is about 0.78 μm and NA is about 0.45, while for DVD the wavelength of light source is about 0.63 to 0.65 μm and NA is about 0.6. Therefore, when two types of optical disks, CD and DVD, are recorded or reproduced by a single optical disk drive, an optical head needs two optical systems. On the other hand, there is a tendency to use a common optical system for CD and for DVD in order to make the drive compact, small and less expensive. For example, a single light source for DVD is used while two converging lenses for CD and for DVD are used, or even for the converging lens, only one converging lens is used commonly while the numerical aperture thereof is changed between for CD and for DVD mechanically or optically.

In an example of an optical system of an optical head in a drive compatible with CD and DVD, an object lens of numerical aperture 0.6 is used as the converging lens. In the object lens, a central portion of numerical aperture equal to or smaller than 0.37 is designed to make aberration minimum when light is converged through a transparent flat plate of thickness 0.9 mm, while an outer portion of numerical aperture equal to or larger than 0.37 is designed to make aberration minimum when light is converged through a transparent flat plate of thickness 0.6 mm. A light beam of wavelength 650 nm emitted by a laser diode is collimated by a condenser lens to become a collimated light beam, and it is incident on the object lens. When a DVD is reproduced, the light beam narrowed by the object lens forms an light spot on an information plane in a DVD of thickness 0.6 mm, while it forms an light spot on an information plane of CD in a plate of thickness 1.2 mm. Next, the light reflected from the optical disk is condensed again by the object lens and detected by a photodetector. The photodetector is constructed such that a focus control signal is detected by astigmatism technique and that a tracking control signal is detected by a phase difference or push-pull technique.

By using the optical head, when a CD is reproduced, the light beam transmitting the central portion of the object lens is reflected by the medium plane and enters the photodetector, while the light beam transmitting the central portion is diverged due to large spherical aberration and does not enter substantially onto the photo-receiving plane of the photodetector. Thus, the numerical aperture is limited substantially to 0.37. On the other hand, when a DVD is reproduced, the light beam transmitting the central portion is synthesized with that transmitting the outer portion to form an light spot, due to small spherical aberration. All of the reflected light thereof enters substantially the photodetector, and reproduction is performed with numerical aperture 0.6.

However, because the prior art optical head obtains the compatibility between CD and DVD by using a light source of wavelength 650 nm, it has a problem that sufficient signals cannot be obtained from an optical disk having wavelength dependence due to difference in reflectivity. This is evident, for example, for a CD-R standardized as a rewritable CD. In the standard of CD-R, the reflectivity is defined to be 65% or higher in wavelength range of 775 to 820 nm, but it decreases at wavelengths outside the above range and the absorptivity increases. For example, the reflectivity decreases to ⅛ times and the absorptivity increases to 8 times, so that reproduction is impossible and even the data recorded by optical absorption are erased.

In order to solve this problem on the compatibility between CD and DVD, it is proposed to use two light sources of wavelengths 780 and 650 nm and to divide the object lens into a central portion and an outer portion surrounding the central portion, wherein the optimum design plate thickness of plate in the central portion is set to 0.9 mm and that in the outer portion is set to 0.6 mm. However, this technique cannot be used practically because the spherical aberration becomes too large when a DVD is reproduced. In a CD drive, the numerical aperture of the object lens is 0.45 for wavelength 650 nm, whereas in the above proposal, the numerical aperture is decreased to 0.37 because the light of lower wavelength 650 nm is used for reproduction of CD. If the numerical aperture at the central portion of the object lens is about 0.37 in the above example, aberration for CD reproduction is about 40 m$\lambda$ (rms) and that for DVD reproduction is about 30 m$\lambda$ (rms), so that reproduction performance is normal. However, when a CD is reproduced with the light source of wavelength 780 nm, the numerical aperture has to be about the same as in a conventional CD drive, and the numerical aperture of the central portion of the object lens is 0.45. However, when the central portion of the object lens having the optimum design plate thickness 0.9 mm is enlarged, aberration becomes larger when a DVD is reproduced. If the central portion is enlarged to numerical aperture 0.45, aberration increases to 80 m$\lambda$ (rms) or higher though it depends on design conditions, and sufficient reproduction performance cannot be provided. An optical head which uses light beams of wavelengths 780 and 650 nm and an object lens having double optimum design plate thicknesses, as explained above, has not yet be provided for reproducing both CD and DVD.

DISCLOSURE OF THE INVENTION

An object of the invention is to provide a converging element having desired converging performance for at least two types of optical information media by using a plurality of light beams, and an optical head and an optical information recording and reproducing apparatus which uses the converging element.

A converging element according to the invention is a converging element which converges a light beam from a light source onto each of at least two types of optical information recording media made of a transparent plate having a thickness different between them. The converging element has an inner region near a center axis of the light beam and an outer region far from the center axis. The outer region has a plane optimized to converge the light beam transmitting the outer region onto a first optical information recording medium among the optical information recording media, and the inner region has a plane optimized to converge the light beam transmitting the inner region onto another optical information recording medium having a larger thickness than the first one. A phase of the light beam transmitting an innermost portion in the plane of the outer region is shifted relative to that of the light beam transmitting an outermost portion of the plane of the inner region. An optical head or an optical information recording and reproducing apparatus according to the invention uses the converging element. According to the structure of the converging element, reproduction performance for an information recording medium having a thin plate thickness (for example DVD) is ensured, while the numerical aperture for reproduction of an information recording medium having a thick plate (for example CD) is increased. Because the numerical aperture for reproduction of an information recording medium having a thick plate can be increased, reproduction becomes possible with a light source of long wavelength for the information recording medium having a thick plate. For example, an optical head or an information recording and reproducing apparatus can be provided even for an information recording medium such as CD-R wherein reproduction becomes impossible because the reflectivity is decreased at a wavelength for reproduction of an information recording medium having a thin plate thickness such as DVD.

For example, the converging element is an object lens which comprises the inner region and the outer region.

Alternatively, for example, the converging element comprises a lens which converges the light beam from the light source onto an optical information recording medium and an optical plate element to be cooperate therewith. The lens comprises a first inner region near the center axis of the light beam and a first outer region far from the center axis. The first outer region has a plane optimized to converge the light beam transmitting the first outer region onto the first optical information recording medium, and the first inner region has a plane optimized to converge the light beam transmitting the first inner region onto the another optical information recording medium having a larger thickness than the first one. The optical plate element comprises a second inner region and a second outer region divided from the second inner region with an optical step. The second inner region and the outer region are arranged such that the light beam transmitting the first outer region transmits the second outer region while the light beam transmitting the first inner region transmits the second inner region when the optical plate element is cooperated with the lens.

Alternatively, for example, the element comprises a lens which converges the light beam from the light source onto an optical information recording medium and an optical plate element to be cooperated therewith. The lens comprises an inner region near the center axis of the light beam and an outer region far from the center axis. The outer region has the plane optimized to converge the light beam transmitting the outer region onto the first optical information recording medium, and the inner region having the plane optimized to converge the light beam transmitting the inner region onto the another optical information recording medium having a larger thickness than the first one. The optical plate element comprises an inner portion and an outer portion divided from the inner one with an optical step. The inner and outer portions are arranged in combination with the lens such that the light beam transmitting the outer region transmits the outer portion and the light beam transmitting the inner region transmits the inner portion.

Another optical head according to the invention converges a light beam from a light source onto each of first and second optical information recording media having different thicknesses. It comprises the light source which generates a light beam to be converged on the first optical information recording medium and another light beam to be converged on the second optical information recording medium. A converging element comprises an inner region near a center axis of the light beam and an outer region far from the center axis. The outer region having a plane optimized to converge the light beam transmitting the outer region onto a first optical information recording medium among the optical information recording media, and the inner region has a plane optimized to converge the light beam transmitting the inner region onto another optical information recording medium having a larger thickness than the first one. A phase of the light beam transmitting an innermost portion in the plane of the outer region is shifted relative to that of the light beam transmitting an outermost portion of the plane of the inner region. A photodetector receives a light reflected from the each of the optical information recording media to convert it to an electric signal. Distance L1 from a first one of the light sources to the converging element and distance L2 from a second one of the light sources to the converging element satisfy a following relationship:

$$L1*0.8<L2<L1*0.95.$$

A still further optical head according to the invention comprises a light source which generates light beams of second and third wavelengths, a converging element comprising a central region having numerical aperture of NA1 and an outer region having numerical aperture between NA1 and NA2, the outer region being formed to decrease aberration when light is converged through a transparent flat plate of thickness of t1, the central region being formed to decrease aberration when light is converged through a transparent flat plate of thickness between t2 and t2*0.7, and an optical system which converges the light beam of the first wavelength through the converging element onto a first information plane of the first optical information recording medium of thickness t1, converges the light beam of the second wavelength through the converging element onto a second information plane of the second optical information recording medium of thickness t2 larger than t1 and guides the light beam reflected from the first or second information plane to a photodetector. An optical element is provided in the optical system, and the optical element prevents incidence of the reflected light of the first wavelength in a ring belt region in correspondence to numerical aperture of the converging element between NA1 and NA1*0.7.

As explained above, by shielding or diffracting light at a part of the object lens having two optimum design plate thicknesses, recording and reproduction becomes possible with the two light sources for information medium having different thicknesses, and even an optical disk having wavelength dependence can be reproduced. Then, the compatibility of all CD disks and DVD disks can be ensured.

An advantage of the invention is to provide a converging element or an optical head wherein reproduction of CD is possible when NA is increased for reproduction of CD and a laser of 780 nm is used while a DVD can be reproduced.

Another advantage of the invention is that compatibility of DVD and CD is realized with an optical head of a simple structure using one converging element. Thus, the optical head can be fabricated in a compact size, and an optical disk drive can also be fabricated in a compact size.

BEST MODE FOR CARRYING OUT THE INVENTION

Figure 1:
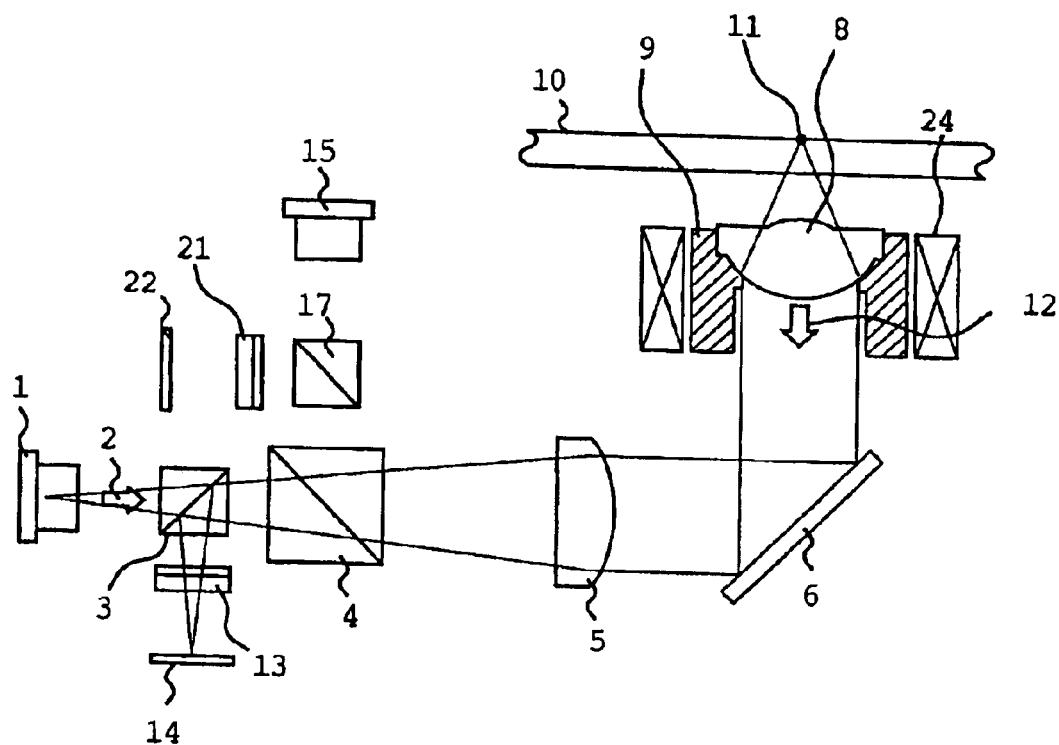
FIG. 1 is a diagram of an optical system of optical head according a first embodiment of the invention.

Referring now to the drawings, wherein like reference characters designate like or corresponding parts throughout the several views, embodiments of the invention are explained.

Figure 2:
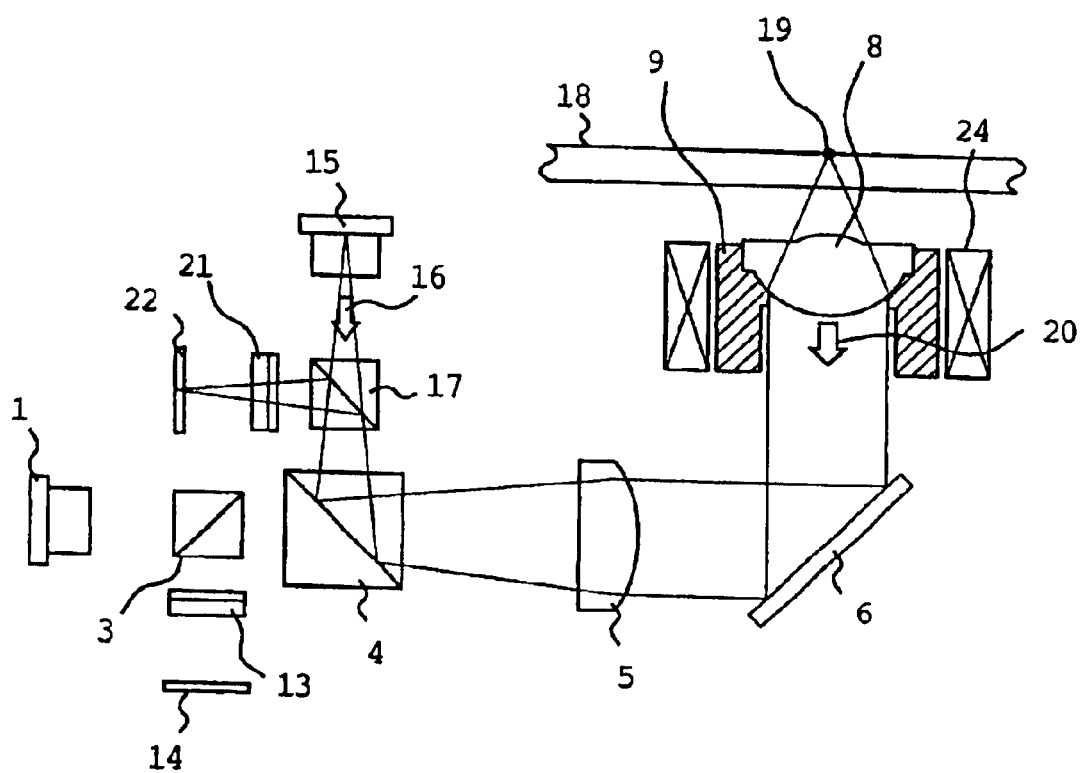
FIG. 2 is another diagram of the optical system of optical head according the first embodiment of the invention.

A first embodiment of the invention is explained with reference to relevant drawings. FIGS. 1 and 2 show an optical system of optical head according this embodiment. FIG. 1 shows a situation for recording and reproduction to and from an optical disk 10 of plate thickness 0.6 mm, while FIG. 2 shows a situation for recording and reproduction to and from an optical disk 18 of plate thickness 1.2 mm. In FIG. 1, a light beam 2 of wavelength 650 nm is emitted by a laser diode 1, and about half thereof transmits a beam splitter 3 to enter a wavelength filter 4. The wavelength filter 4 is designed to transmit light of wavelength 650 nm and to reflect light of wavelength 780 nm. Then, the light beam 2 transmits the wavelength filter 4 and is collimated by a condenser lens 5 to become a generally collimated light beam. The collimated light beam 2 is reflected by a mirror 6, transmits a light-shielding filter 7 and enters an object lens 8 of numerical aperture 0.6. The object lens 8 is designed so that a central portion 8a of numerical aperture equal to or smaller than 0.45 has minimum aberration for a disk plate thickness 0.9 mm while an outer portion 8b of numerical aperture equal to or larger than 0.45 has minimum aberration for a disk plate thickness 0.6 mm. The light beam 2 is converged by the object lens 8 to form a light spot 11 on an information plane in the optical disk 10 of plate thickness 0.6 mm.

The light 12 reflected by the optical disk 10 is condensed by the object lens 8, passes the light-shielding filter 7 and the mirror 6 and is condensed by the condenser lens 5. Then, the light beam 12 transmits the wavelength filter 4 to enter the beam splitter 3. About half of the light incident on the beam splitter 3 is reflected. Then, it transmits a cylindrical lens 13 and is received by a photodetector 14. The photodetector 14 detects not only reproduction signals, but also a focus control signal for making the object lens 8 follow the information plane with astigmatism technique and a tracking control signal for tracking an information track with phase difference technique or push-pull technique.

On the other hand, in FIG. 2, a light beam 16 of wavelength 780 nm is emitted by a laser diode 15, and about half thereof transmits a beam splitter 17 to enter the wavelength filter 4. The wavelength filter 4 is designed to reflect light of wavelength 780 nm. Thus, the light beam 16 is reflected by the wavelength filter 4 and is collimated by the condenser lens 5. The collimated light beam 16 passes the mirror 6 and enters the object lens 8. The light beam 16 of wavelength 780 nm is converged by the object lens 8 to form a light spot 19 on an information plane in the optical disk 18 of plate thickness 1.2 mm.

Next, the light 20 reflected by the optical disk 18 is collected by the object lens 8, passes the mirror 6 and is condensed by the condenser lens 5. Then, it is reflected by the wavelength filter 4 to enter the beam splitter 17. About half of the light incident on the beam splitter 17 is reflected. Then, it transmits a cylindrical lens 21 and is received by a photodetector 22. The photodetector 22 detects not only reproduction signals, but also the focus control signal with astigmatism technique and the tracking control signal with phase difference technique or push-pull technique.

Figure 3:
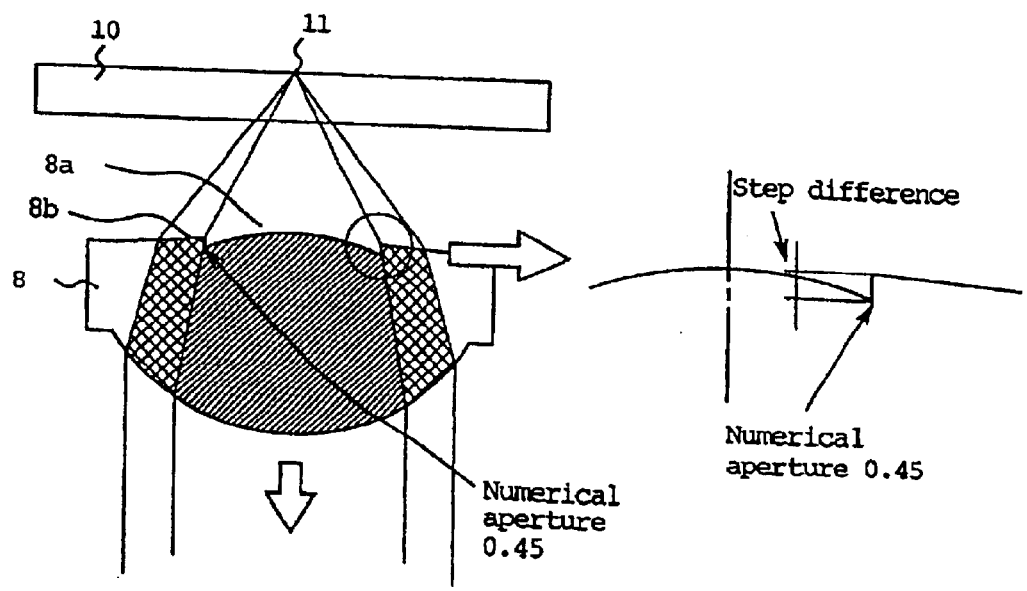
FIG. 3 is a diagram of an object lens in the optical system of optical head according the first embodiment of the invention.
Figure 4:
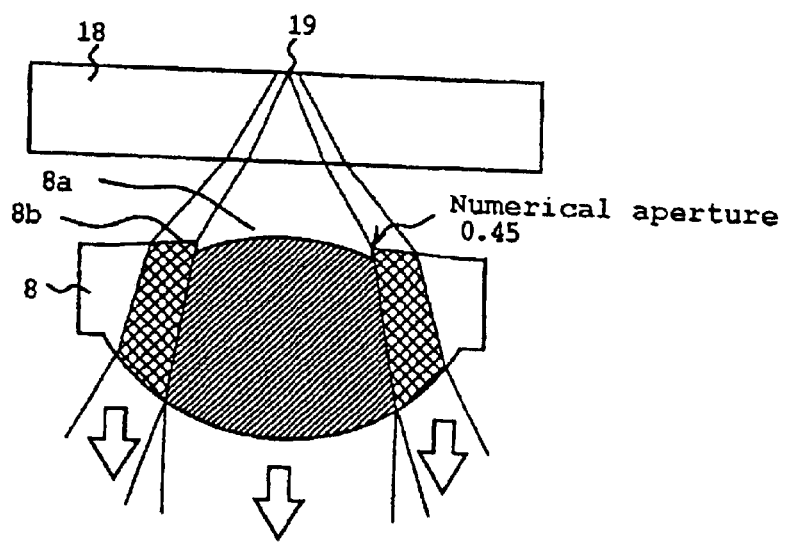
FIG. 4 is another diagram of the object lens in the optical system of optical head according the first embodiment of the invention.

In the above-mentioned structure using two wavelengths 650 and 780 nm, when a CD is reproduced with light of wavelength 780 nm, the numerical aperture of the central portion 8a of the object lens 8 has to be decreased to about 0.45. However, if the numerical aperture of optimum design plate thickness 0.9 mm becomes 0.45, the light spot 11 for recording and reproduction of DVD generates aberration larger than 80 mλ rms. Usually a light spot having aberration larger than 80 mλ rms has large so-called side lobes, so that recording and reproduction performance is deteriorated. Therefore, if the light source of 780 nm is added and only the numerical aperture of the central portion 8a is increased in the prior art optical head, the performance is not satisfactory. In this embodiment, the light source of 780 nm is added and the numerical aperture of the central portion 8a is increased. Further, as shown in FIG. 3, a step (difference in level) is provided at a boundary between the outer portion and the inner portion of the object lens 8 to decrease Zernike's fifth spherical aberration component in the aberration components. Thus, the side lobes of the light spot 11 are reduced and this improves the recording and reproduction performance.

Figure 5:
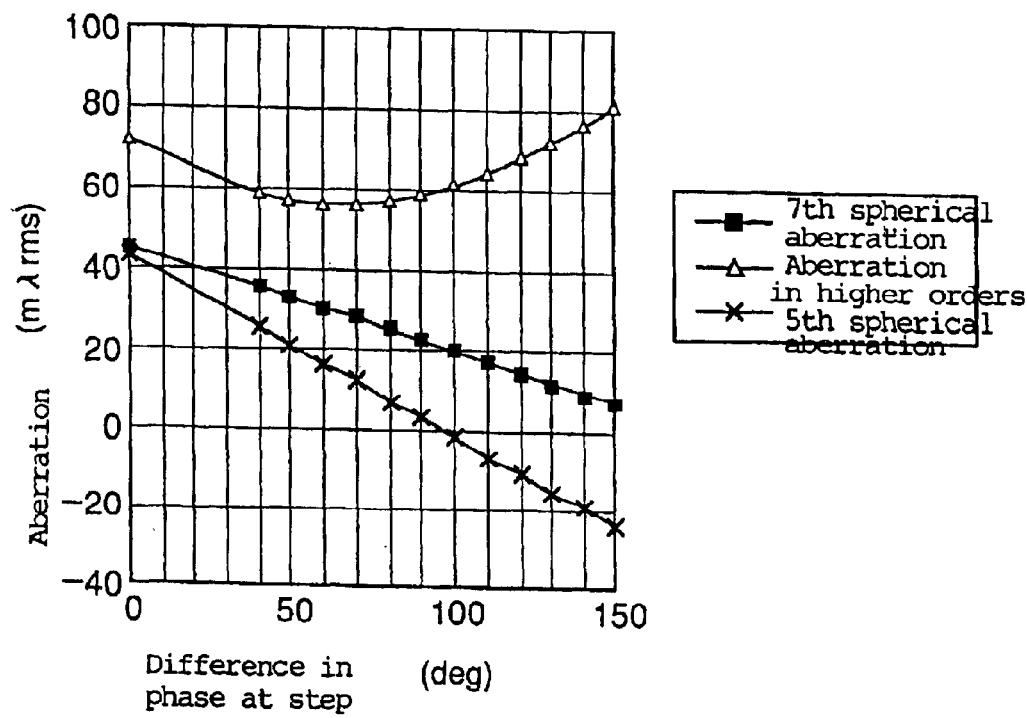
FIG. 5 is a graph on a relationship between step height in the object lens and spherical aberration of light spot.
Figure 6:
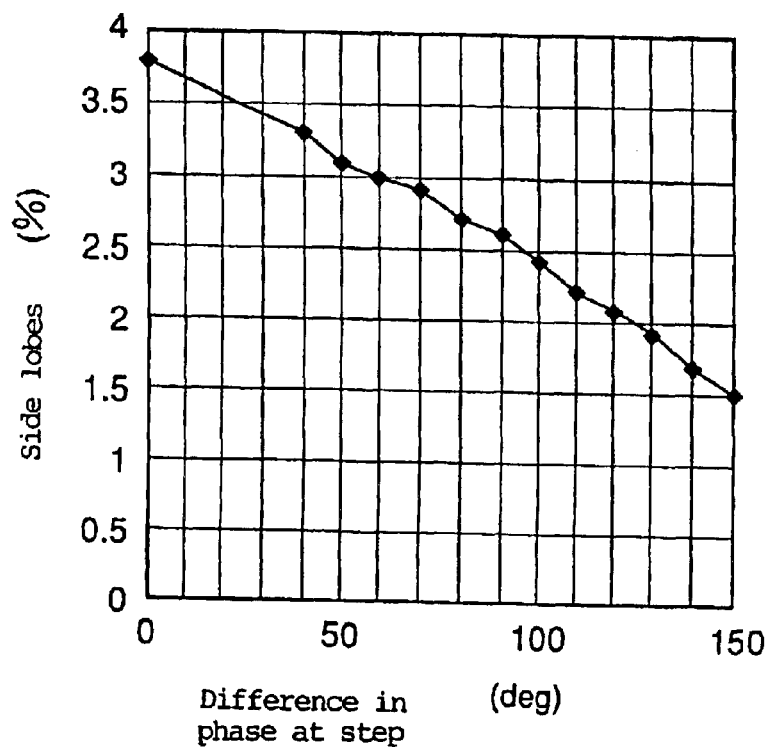
FIG. 6 is a graph on a relationship between step height in the object lens and side lobes.

FIGS. 5 and 6 show graphs on a relationship between step height (or difference in height, converted to difference in phase of light of wavelength 650 nm) in the object lens and spherical aberration of converging spot and on a relationship between step height in the object lens and side lobes (wherein the main lobe is displayed to have amplitude of 100%), respectively. It is apparent that by setting an appropriate value of the phase step, the fifth spherical aberration can be decreased and that the side lobes can be reduced. In order to suppress the fifth aberration equal to or smaller than 20 mλ (rms), it is preferable that the phase shift is in a range between 50 and 150 degrees. When the phase step (phase difference) is changed, the total aberration is not changed much. In this embodiment, the step is set to an amount in correspondence to 100 degrees of phase difference.

On the other hand, when the optical disk 18 of plate thickness 1.2 mm such as CD is used for recording or reproduction, the range of numerical aperture of 0.45 of the object lens 8 is set for the optimum design plate thickness 0.9 mm, so that the aberration of the light transmitting it is suppressed to a similar order to the prior art structure. As shown in FIG. 3, the light beam transmitting the outer portion 8b of the object lens 8 has large spherical aberration and diffuses in a relatively wide range in the information plane in an optical disk 18, and the reflected light also is diffused with large spherical aberration. Therefore, the reflected light of the light transmitting the outer portion 8b does not enter the photodetector 22 generally. Then, without providing a means for limiting numerical aperture, CD reproduction becomes possible at numerical number 0.45.

Figure 7:
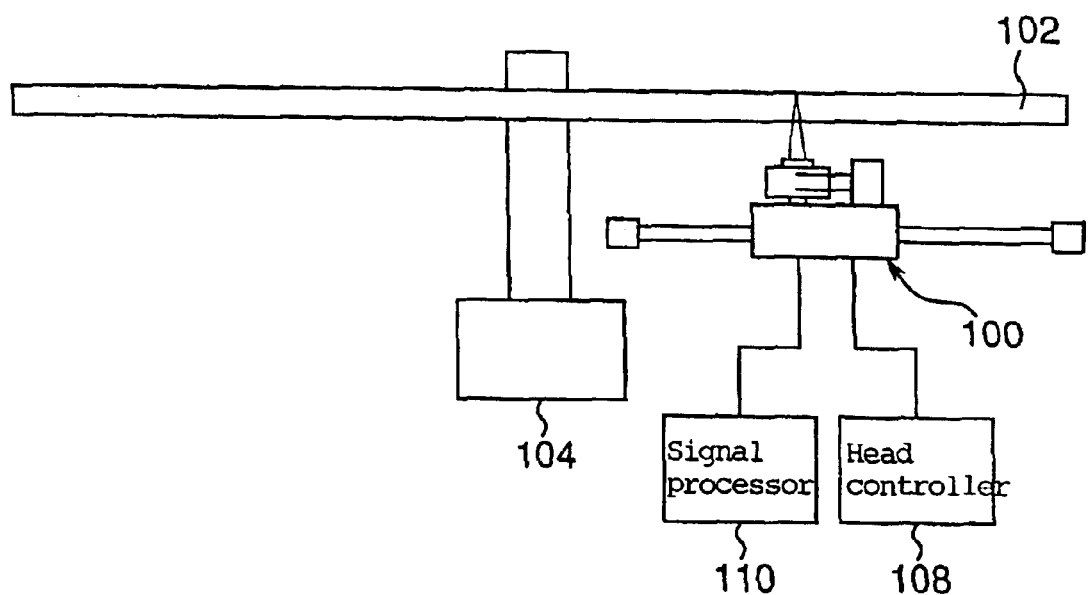
FIG. 7 is a schematic diagram of an apparatus of recording and reproducing optical information.

FIG. 7 shows schematically an apparatus of recording and reproducing optical information which uses the above-mentioned optical head 100. The structure of the apparatus except the optical head is similar to a prior art one. An optical disk 102 as an information medium is rotated by a motor 102. The optical head 100 is moved along a shaft in a radial direction. In order to record or reproduce information, in the optical head 100 a light beam emitted by a laser diode is focused by an object lens onto an information recording plane in the optical disk 102. A focus control signal for making the object lens follow the plane of the optical disk 102 and a tracking control signal for tracking an information track in the optical disk 102 are detected based on output signals of the photodetector 22 in the optical head 100. A head controller 108 performs focus control and servo control on the optical head based on the control signals. Further, a signal processor 110 discriminates a type of an optical disk, and records information to the optical disk 102 with the optical head and reproduces optical information recorded in information tracks in the optical disk 102 according to the output signals of the photodetector in the optical head 100.

It is to be noted that various optical heads which will be explained below in following embodiments can also be used in the apparatus of recording and reproducing optical information.

Figure 8:
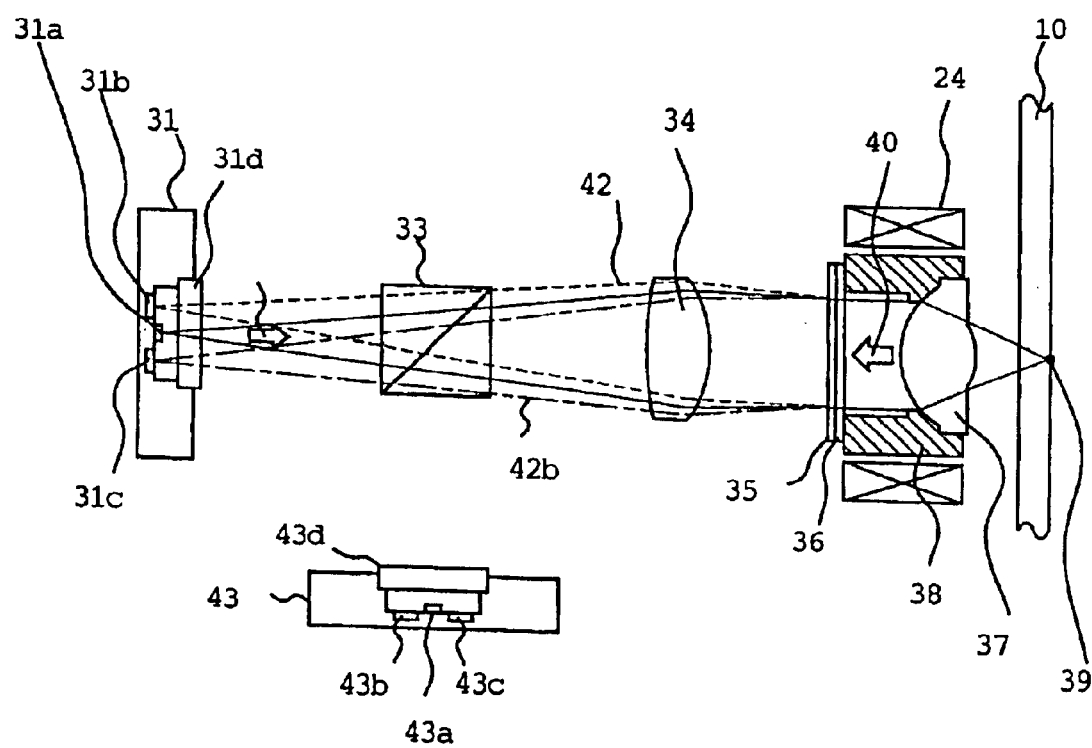
FIG. 8 is a diagram of an optical system of optical head according a second embodiment of the invention.
Figure 9:
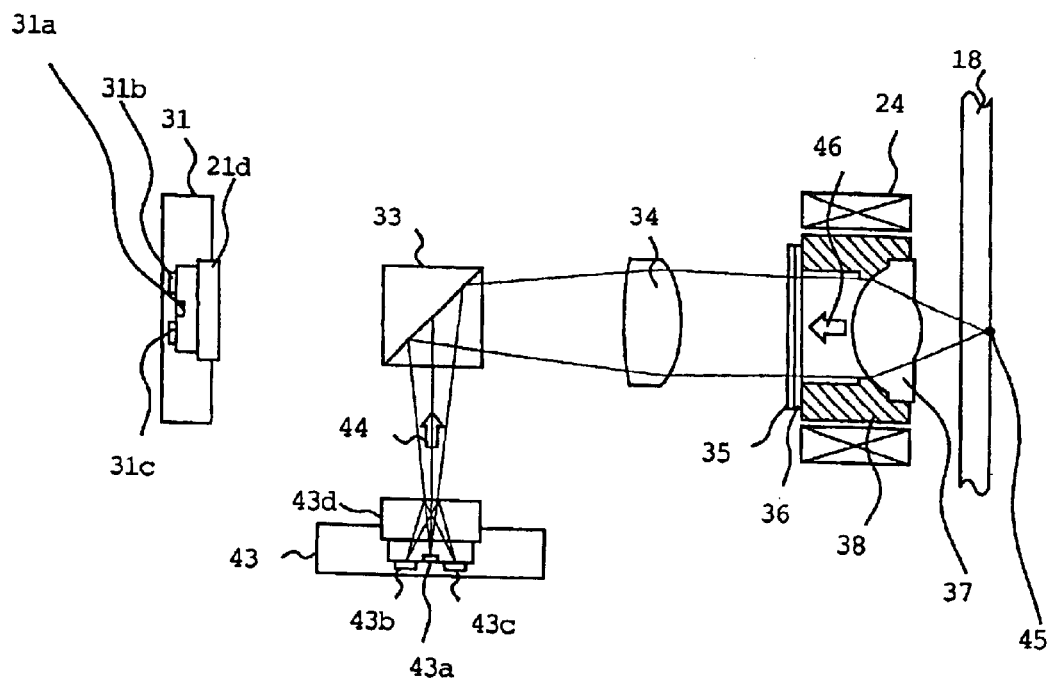
FIG. 9 is another diagram of the optical system of optical head according the second embodiment of the invention.

Next, a second embodiment of the invention is explained with reference to relevant drawings. FIGS. 8 and 9 show an optical system of optical head according the second embodiment of the invention. FIG. 8 shows a situation for recording and reproduction to and from an optical disk 10 of plate thickness 0.6 mm, while FIG. 9 shows a situation for recording and reproduction to and from an optical disk 18 of plate thickness 1.2 mm. In FIG. 8, a first module 31 for DVD comprises a laser diode 31a of wavelength 650 nm which is integrated as one body with photodetectors 31b and 31c for receiving light reflected from the optical disk 10. A light beam 32 of wavelength 650 nm emitted by the laser diode 31a in the first module 31 transmits a cover glass 31d to enter a wavelength filter 33. The wavelength filter 33 transmits light of 650 nm and reflects light of wavelength 780 nm. Thus, the light beam 32 transmits the wavelength filter 33 and is collimated by a condenser lens 34 to become a generally collimated light beam. The collimated light beam 32 transmits a polarizing hologram 35 and a wavelength plate 36 to enter an object lens of numerical aperture 0.6. The polarizing hologram 35 and the wavelength plate 36 are integrated as one body, and they are fixed to a holder 38 with the object lens 37.

Figure 10:
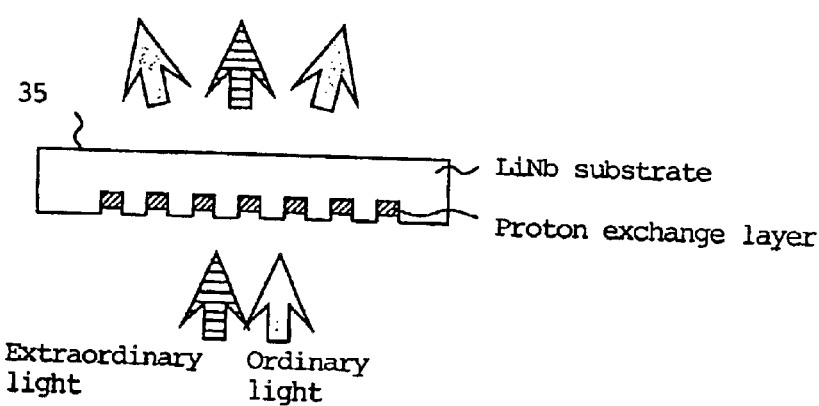
FIG. 10 is a diagram of a polarizing hologram.

As shown in FIG. 10, the polarizing hologram 35 is fabricated by forming a hologram in a LiNb plate made of a birefringence material with proton exchange. It transmits extraordinary light and diffracts ordinary light. The light beam 32 is handled as extraordinary light by the polarizing hologram 35 and it transmits the polarizing hologram 35 without diffraction. The wavelength plate 36 converts light of wavelength 650 nm from linear polarization to generally circular polarization and does not change polarization for light of wavelength 780 nm. Thus, the light beam 32 is converted to circular polarization.

The object lens 37 is designed similarly to the counterpart 8 in the first embodiment. A central portion 37a of numerical aperture equal to or smaller than 0.45 has minimum aberration for a disk plate thickness 0.9 mm while an outer portion 37b of numerical aperture equal to or larger than 0.45 has minimum aberration for a disk plate thickness 0.6 mm. The light beam 32 is converged by the object lens 37 to form a light spot 17 on an information plane in the optical disk 10 of plate thickness 0.6 mm.

Next, the light 40 reflected by the optical disk 10 is condensed by the object lens 37, is converted by the wavelength plate 36 from the circular polarization to linear polarization having a polarization direction perpendicular to a polarization plane of the light beam 32 and enters the polarizing hologram 35. Because the reflected light 40 enters the polarizing hologram 35 as ordinary light, it is diffracted. The diffraction divides the reflected light 40 into diffracted light 42a for detecting focus signal and diffracted light 42b for detecting tracking signal. The diffracted lights 42a and 42b are narrowed by the condenser lens 34 and are received by the photodetectors 31b and 31c, respectively. Reproduction signals are detected by one or both of the photodetectors. Further, the photodetector 31b detects a focus control signal for making the object lens 37 follow the information plane with spot size detection technique and the photodetector 31c detects a tracking control signal for tracking an information track with phase difference technique or push-pull technique.

On the other hand, a second module 43 for CD comprises a laser diode 43a of wavelength 780 nm, a hologram 43d for separating reflected light from an optical disk to give spacial change and photodetectors 43a, 43b for detecting the reflected light, and they are integrated as one body. In FIG. 9, a part of a light beam 44 of wavelength 780 nm emitted by the laser diode 43a in the second module 43 transmits the hologram 43d and enters the wavelength filter 33. Because the wavelength filter 33 transmits light of 650 nm and reflects light of wavelength 780 nm, the light beam 44 is reflected by the wavelength filter 33 and is collimated by the condenser lens 34. The collimated light beam 44 transmits the polarizing hologram 35 and the wavelength plate 36 to enter the object lens of numerical aperture 0.6. The light beam 44 is handled as extraordinary light by the polarizing hologram 35 and it transmits the polarizing hologram 35 without diffraction. Because the wavelength plate 36 does not convert polarization direction of light of wavelength 780 nm, the polarization plane of the light beam 44 is maintained. Thus, the light beam 44 is focused by the object lens 37 to form a light spot 35 on an information plane in the optical disk 18 of plate thickness 1.2 mm.

The light 46 reflected by the optical disk 18 is condensed by the object lens 37, transmits the wavelength plate 36 and the polarizing hologram 35. Because the wavelength plate 36 does not change polarization direction for light of wavelength 780 mm, the reflected light 46 transmits the wavelength plate 36 as linear polarization, similarly to the light beam 44. Because the reflected light 46 enters the polarizing hologram 35 as extraordinary light, it is not diffracted. The light 46 transmitting the polarizing hologram 35 is narrowed by the condenser lens 34 and is reflected by the wavelength filter 33 to enter the second module 43. The reflected light 46 entering the second module 43 is diffracted by the hologram 43d to enter the photodetectors 43b and 43c, and reproduction signals are detected by one or both of the photodetectors. Further, the photodetector 43b detects a focus control signal for making the object lens 37 follow the information plane with spot size detection technique and the photodetector 43c detects a tracking control signal for tracking an information track with phase difference technique or push-pull technique.

Figure 11:
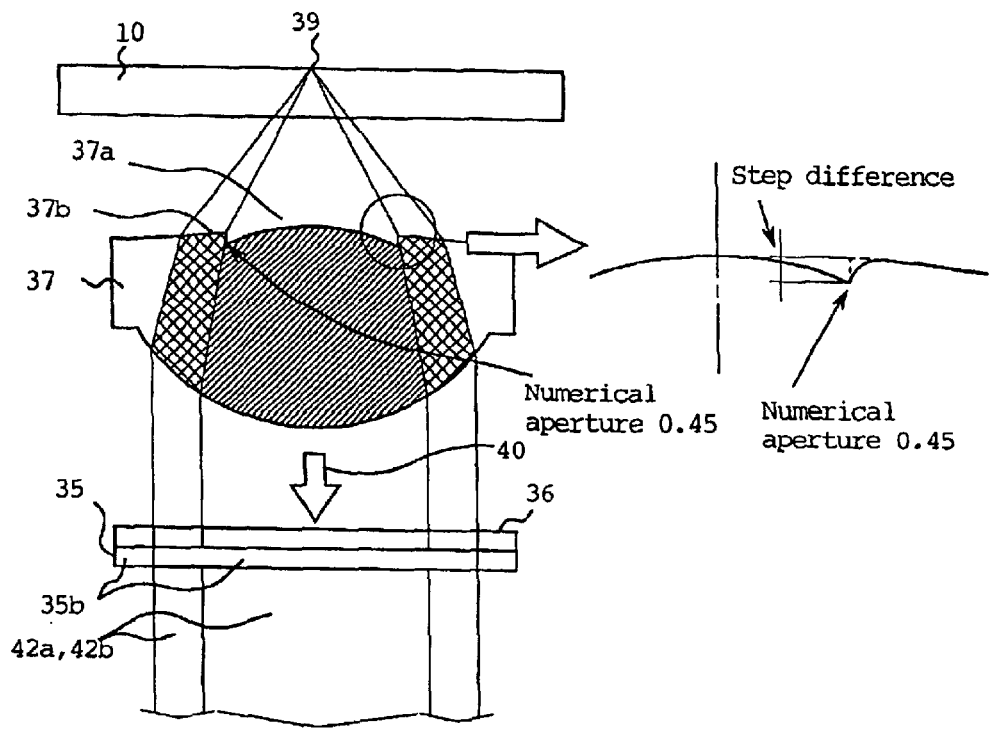
FIG. 11 is a diagram of an object lens according the second embodiment of the invention.

In the above-mentioned structure using two wavelengths 650 and 780 nm, when a CD is reproduced with light of wavelength 780 nm, the numerical aperture of the central portion 37a of the object lens 37 has to be decreased to about 0.45. However, if the numerical aperture of optimum design plate thickness 0.9 mm becomes 0.45, the light spot 11 for recording and reproduction of DVD generates aberration larger than 80 mλ rms. Usually a light spot having aberration larger than 80 mλ rms has large so-called side lobes, so that recording and reproduction performance is deteriorated. Therefore, if the light source of 780 nm is added and only the numerical aperture of the central portion 8a is increased in the prior art optical head, the performance is not satisfactory. In this embodiment, the numerical aperture of the central portion 37a is increased, and similarly to the first embodiment, as shown in FIG. 11, a step (difference in level) is provided at a boundary between the outer portion and the inner portion of the object lens 37 to decrease fifth spherical aberration component in the aberration components. Thus, the side lobes of the light spot 39 are reduced to improve the recording and reproduction performance.

In order to suppress the fifth aberration to 20 mλ (rms) or less, it is found that it is desirable that the phase shift has a value in a range between 50 and 150 degrees. It is also found that the total aberration is not changed much when the phase step (phase difference) is changed. In this embodiment, the step is provided by forming a smooth curve in order to improve formability of the object lens. By using such a lens having a smooth shape, an object lens made of glass can be formed while ensuring stable performance against change in ambient temperature. On the other hand, when the optical disk 18 of plate thickness 1.2 mm such as CD is used for recording or reproduction, the range of numerical aperture of 0.45 of the object lens 37 is set for the optimum design plate thickness 0.9 mm, so that the aberration of the light transmitting it is suppressed to a similar order to the prior art structure.

Figure 12:
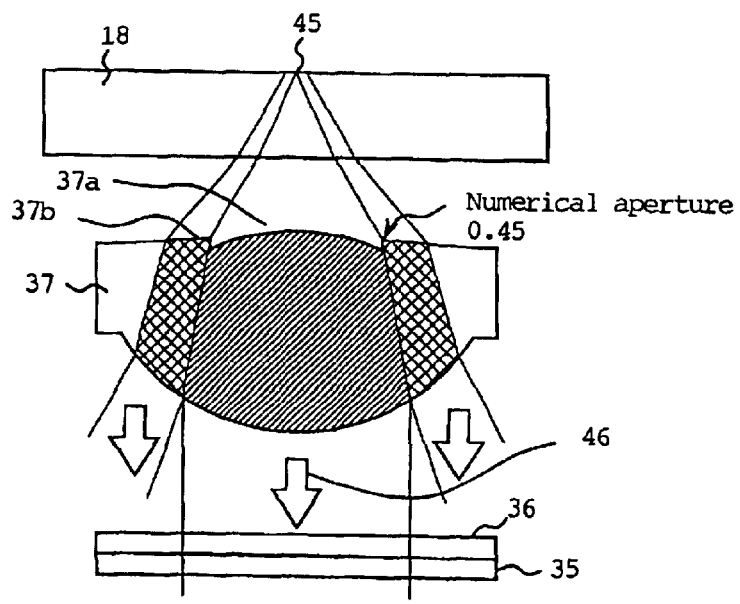
FIG. 12 is another diagram of the object lens according the second embodiment of the invention.

As shown in FIG. 12, the light beam transmitting the outer portion 37b of the object lens 37 has large spherical aberration and diffuses in a relatively wide range in the information plane in an optical disk 18, and the reflected light is also diffused with large spherical aberration. Therefore, the reflected light of the light transmitting the outer portion 37b does not enter the photodetectors 43b, 43c generally. Then, without providing a means for limiting numerical aperture, CD reproduction becomes possible at numerical number 0.45.

It is apparent from the above-mentioned explanation that according to the first and second embodiments a lens can be provided which can reproduce a CD as well as a DVD by increasing NA for CD reproduction and by using a laser of 780 nm. Thus, compatibility of DVD and CD is realized with a simple optical head including one object lens. Further, an optical head can be fabricated compactly, and an optical disk drive can also be manufactured compactly.

Next, a third embodiment of the invention is explained with reference to relevant drawings. An optical head of the third embodiment has a simple structure which realizes compatibility of DVD and CD by using one object lens having double optimum design plate thicknesses. The object lens has large NA for CD reproduction and can reproduce a CD with a laser of 780 nm while reproducing a DVD.

Figure 13:
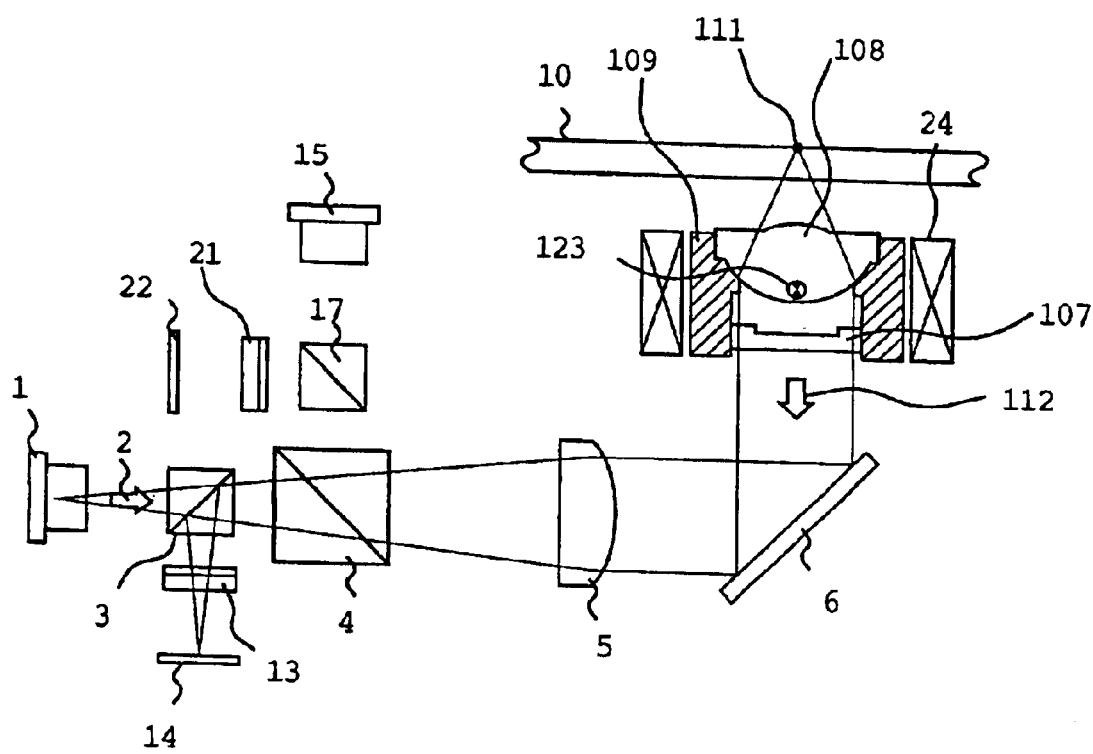
FIG. 13 is a diagram of an optical system of optical head according a third embodiment of the invention.
Figure 14:
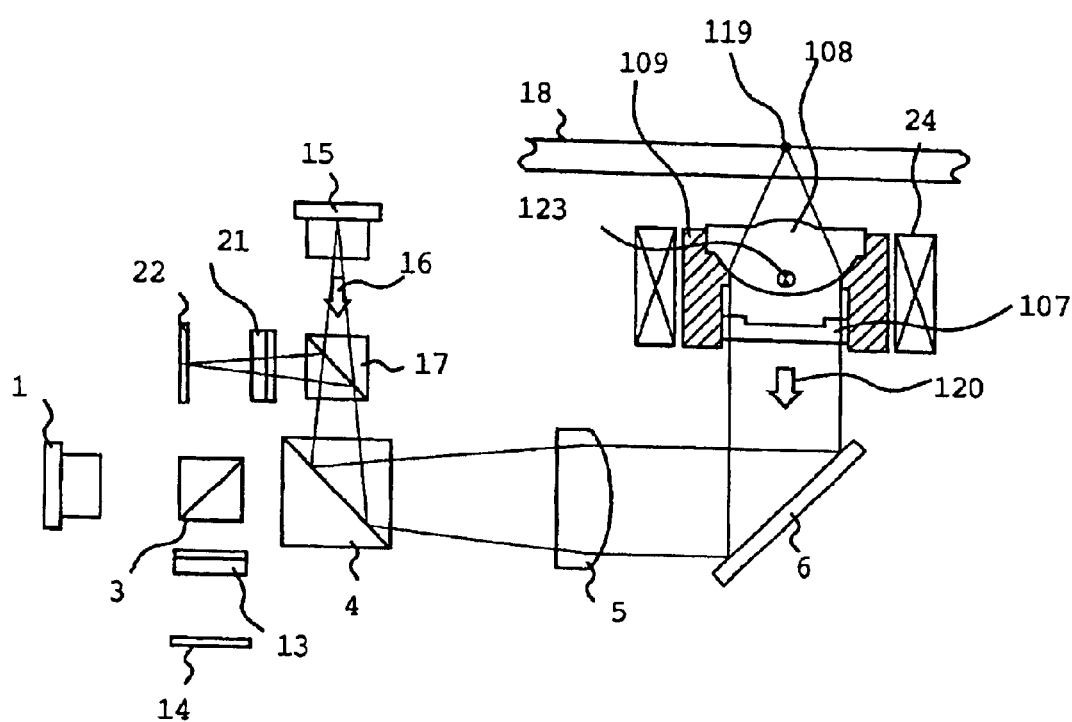
FIG. 14 is another diagram of the optical system of optical head according the third embodiment of the invention.

FIGS. 13 and 14 shows an optical system of optical head according the third embodiment of the invention. FIG. 13 shows a situation for recording and reproduction to and from an optical disk 10 of plate thickness 0.6 mm, while FIG. 14 shows a situation for recording and reproduction to and from an optical disk 18 of plate thickness 1.2 mm. An optical system uses laser diodes 1 and 15 which generate light beams of 650 nm and of 870 nm, respectively, while it uses a common object lens 108 which focuses the light beam onto an optical disk. In detail, a section consisting of a laser diode, a beam splitter, a cylindrical lens and a photodetector is provided for each wavelength, but light beams of different wavelengths from two optical paths are guided to one optical path by using a wavelength filter which transmits light of wavelength 650 nm and reflects light of wavelength 780 nm. A further section from the wavelength filter 4 to the object lens 108 is used commonly. Generally, in an optical head for reproduction of optical information media of disk plate thickness t2 (0.6 mm) or t1 (1.2 mm), the optimum design plate thickness at the central portion of the object lens 108 is set to a value from t1*0.6 to t1 and that at the outer portion is set to 0.6 mm. The range of the optimum design plate thickness is determined experimentally. Further, a step is provided for a phase shift element (optical plate element) 107 to be cooperated with the object lens 108. Then, information can be recorded or reproduced for an information medium of disk plate thickness t1 and for that of disk plate thickness t2 in a state where side lobes are small.

The optical head is explained further. When an optical disk 10 of plate thickness 0.6 mm is recorded or reproduced with a light beam of wavelength 650 nm, in FIG. 14, about a half of a light beam 2 (for DVD) of wavelength 650 nm emitted by the first laser diode 1 transmits the beam splitter 3 to enter the wavelength filter 4. The wavelength filter 4 is designed to transmit light of wavelength 650 nm and to reflect light of wavelength 780 nm. Thus, the light beam 2 transmits the wavelength filter 4 and is collimated by a condenser lens 5 to become a generally collimated light beam. The collimated light beam 2 is reflected by a mirror 6, transmits a phase shift element 107 as the optical plate element and enters the object lens 108 of numerical aperture 0.6.

Figure 15:
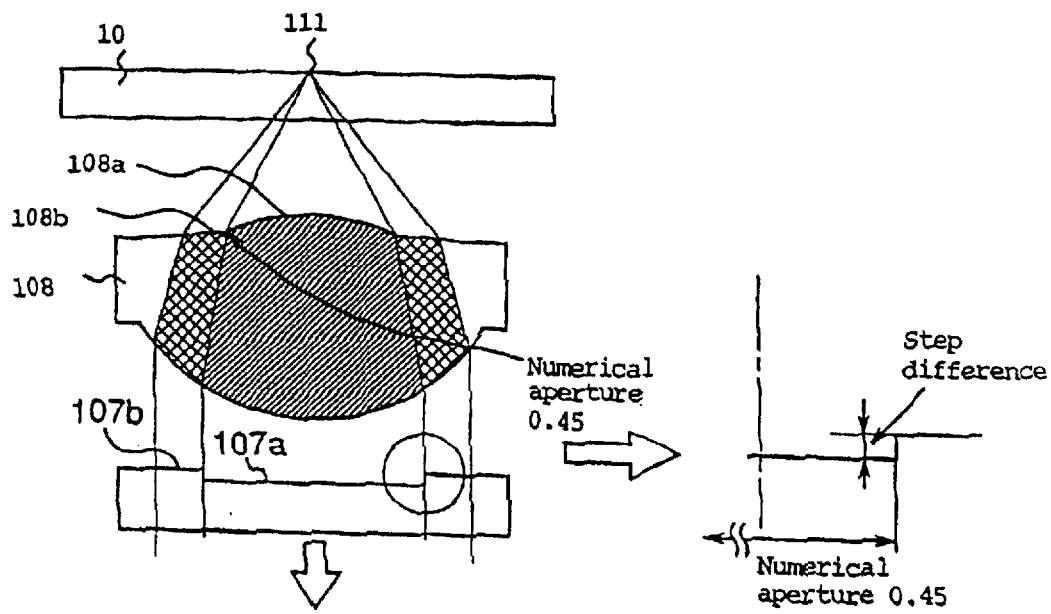
FIG. 15 is a diagram of an object lens in the optical system of optical head according the third embodiment of the invention.
Figure 16:
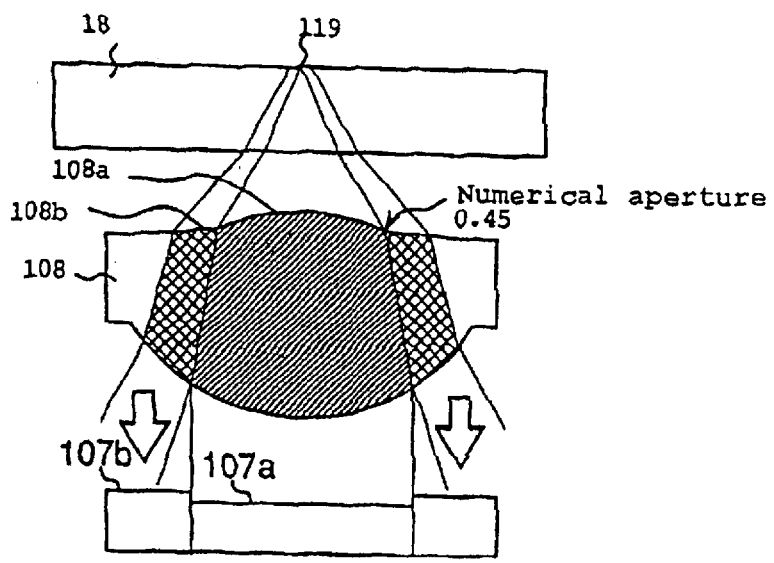
FIG. 16 is another diagram of the object lens in the optical system of optical head according the third embodiment of the invention.

With reference FIGS. 15 and 16, a structure and arrangement of the phase shift element 107 and the object lens 108 are explained. The phase shift element 107 and the object lens 108 are arranges so that the centers thereof coincide with the center axis of the light beam. The object lens 108 comprises a central portion (inner region) 108a near the center axis of light beam and an outer portion (outer region) 108b far from the center axis. The central portion 108a has a plane optimized to converge the light beam transmitting the inner region onto a thin optical disk, while the outer portion 108b has a plane optimized to converge the light beam transmitting the outer region onto an optical disk thicker than the optical disk having the thin thickness. Further, the phase shift element 107 is an optical plate element having a step in order to change the phase. By combining the phase shift element 107 and the object lens 108, the phase of the light beam transmitting an innermost portion of the outer portion 108b of the object lens 108 is shifted relative to the phase of the light beam transmitting an outermost portion of the central portion 108a.

In concrete, the object lens 108 is designed so that a central portion 108a of numerical aperture equal to or smaller than 0.45 has minimum aberration for a disk plate thickness 0.9 mm while an outer portion 108b of numerical aperture equal to or larger than 0.45 has minimum aberration for a disk plate thickness 0.6 mm. The light beam 2 is converged by the object lens 108 to form a light spot 111 on an information plane in the optical disk 10 of plate thickness 0.6 mm.

Next, the light 112 reflected by the optical disk 10 is condensed by the object lens 108, passes the phase shift element 107, and the mirror 6 and is condensed by the condenser lens 5. Then, the narrowed light beam 112 transmits the wavelength filter 4 to enter the beam splitter 3. About half of the light incident on the beam splitter 3 is reflected. Then, it transmits a cylindrical lens 13 and is received by a photodetector 14. The photodetector 14 detects not only reproduction signals, but also a focus control signal for making the object lens 108 follow the information plane with astigmatism technique and a tracking control signal for tracking an information track with phase difference technique or push-pull technique.

On the other hand, as shown in FIG. 14, a light beam 16 (for CD) of wavelength 780 nm is emitted by the laser diode 15, and about half thereof transmits a beam splitter 17 to enter the wavelength filter 4. Because the wavelength filter 4 is designed to reflect light of wavelength 780 nm, the light beam 16 is reflected by the wavelength filter 4 and is collimated by the condenser lens 5. The collimated light beam 16 passes the mirror 6, transmits the phase shift element 107 and enters the object lens 108 of numerical aperture 1.2. The light beam 2 of wavelength 780 nm is converged by the object lens 108 to form a light spot 119 on an information plane in the optical disk 18 of plate thickness 1.2 mm.

The light 120 reflected by the optical disk 18 is collected by the object lens 108, passes the mirror 6 and is condensed by the condenser lens 5. Then, it is reflected by the wavelength filter 4 to enter the beam splitter 17. About half of the light incident on the beam splitter 17 is reflected. Then, it transmits a cylindrical 5 lens 21 and is received by a photodetector 22. The photodetector 22 detects not only reproduction signals, but also the focus control signal with astigmatism technique and the tracking control signal with phase difference technique or push-pull technique.

The object lens 108 and the phase shift element 107 are fixed so as to keep dynamical balance relative to a center of gravity 123 of a moving device comprising an object lens holder 109 having a drive means movable in focus direction as optical axis of the object lens and in tracking direction as a radial direction of the disk. Because the dynamical balance of the object lens 108 and the phase shift element 107 is kept relative to the center of gravity of the movable device, even when a balancer or the like is not used, distortion relative to the optical axis of the object lens 108 is small. Therefore, an optical head and an information recording and reproducing apparatus have good quality of signals on recording and on reproduction.

In the above-mentioned structure using two wavelengths 650 and 780 nm, when a CD is reproduced with light of wavelength 780 nm, the numerical aperture of the central portion 108a of the object lens 108 has to be decreased to about 0.45. However, if the numerical aperture of optimum design plate thickness 0.9 mm becomes 0.45, the light spot 11 for recording and reproduction of DVD generates aberration larger than 80 mλ rms. Usually a light spot having aberration larger than 80 mλ rms has large so-called side lobes, so that recording and reproduction performance is deteriorated. Therefore, if the light source of 780 nm is added and only the numerical aperture of the central portion 8a is increased in the prior art structure, the performance is not satisfactory. In this embodiment, the numerical aperture of the central portion 108a of the object lens 108 is increased, and an optical step is provided at a boundary between the inner portion 107a and the outer portion 107b of the phase shift element 107. Thus, fifth spherical aberration component in the aberration components is decreased for the light spot formed after transmitting the object lens 108. As shown for example in FIG. 15, the optical step is formed by thinning the thickness in the inner portion 107b. By providing the step, the side lobes of the light spot 39 are reduced for light beams of the two wavelengths to improve the recording and reproduction performance. Because the phase shift element 107 and the object lens 108 are provided separately, it is advantageous that the shape of the object 108 can be simplified. It is also advantageous that a glass lens favorable for change in ambient temperature can be adopted easily. In order to suppress the fifth aberration equal to or smaller than 20 mλ (rms), it is preferable that the phase shift is in a range between 50 and 150 degrees. When the phase step is changed, the total aberration is not changed much. In this embodiment, the step is set to an amount in correspondence to 125 degrees of phase difference of light of wavelength 650 nm.

On the other hand, when the optical disk 18 of plate thickness 1.2 mm such as CD is used for recording or reproduction, the range of numerical aperture of 0.45 of the object lens 108 is set for the optimum design plate thickness 0.9 mm, so that the aberration of the light transmitting it is suppressed to a similar order to the prior art structure. As shown in FIG. 16, the light beam transmitting the outer portion 108b of the object lens 108 has large spherical aberration and is diverged in a relatively wide range in the information plane in an optical disk 18, and the reflected light also is diverged with large spherical aberration. Therefore, the reflected light of the light transmitting the outer portion 108b does not enter the photodetector 22 generally. Then, without providing a means for limiting numerical aperture, CD reproduction becomes possible at numerical number 0.45.

Figure 17:
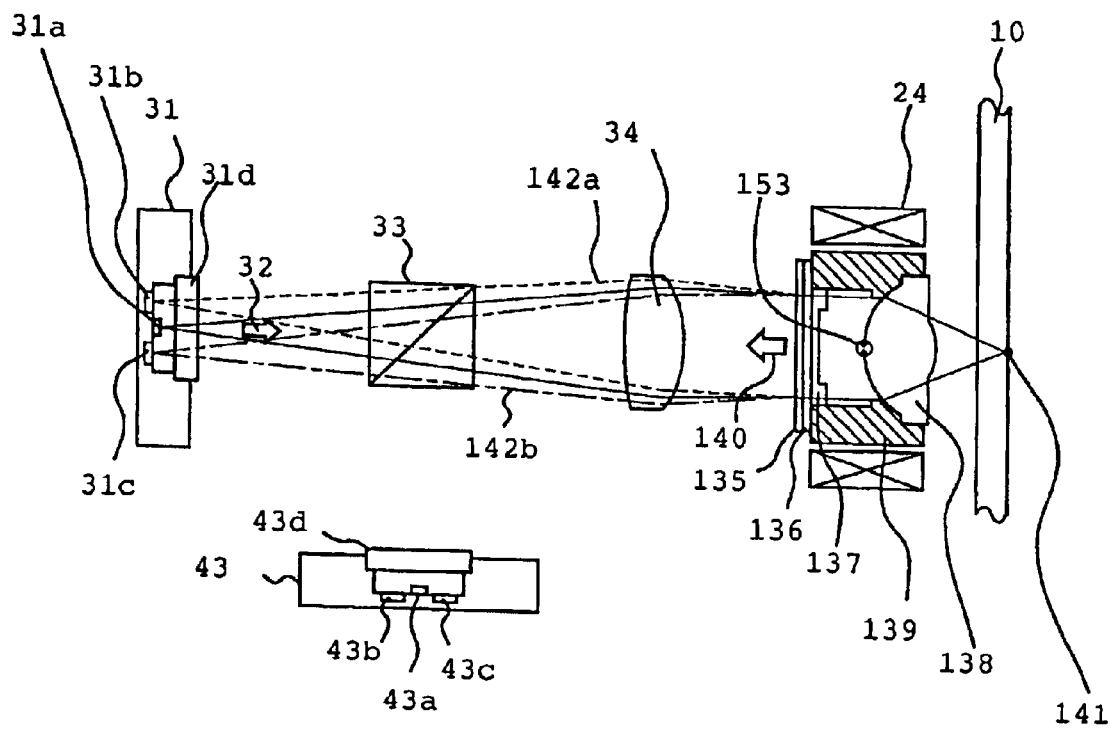
FIG. 17 is a diagram of an optical system of optical head according a fourth embodiment of the invention.
Figure 18:
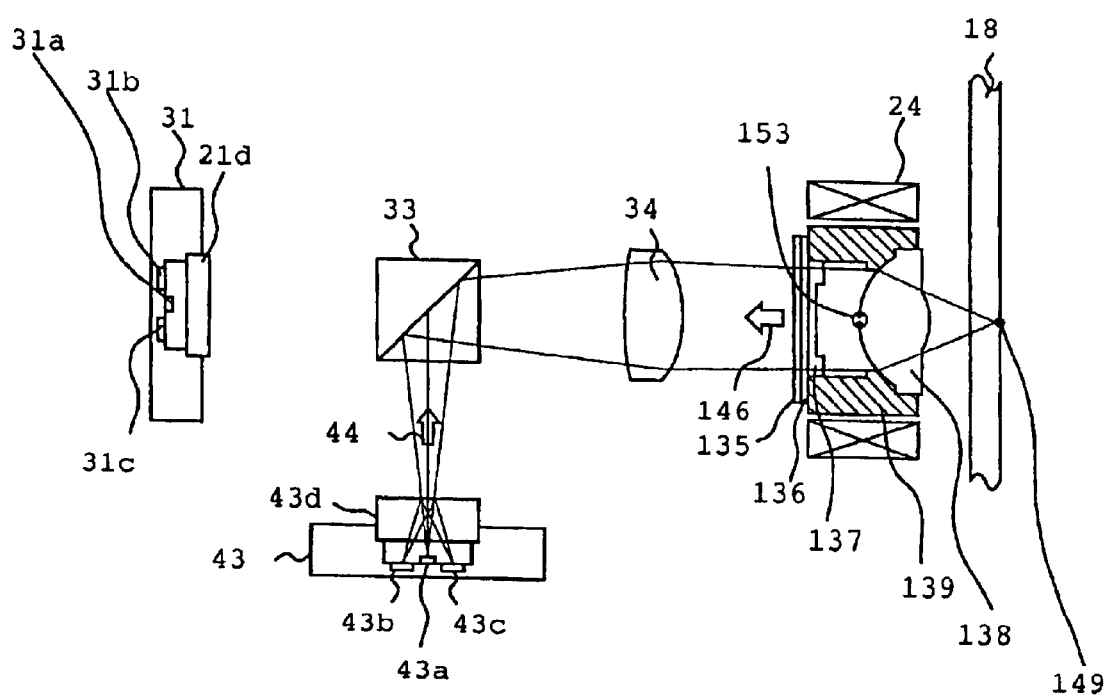
FIG. 18 is another diagram of the optical system of optical head according the fourth embodiment of the invention.

Next, an optical head according to a fourth embodiment of the invention is explained with reference to relevant drawings. An optical head of the fourth embodiment comprises modules 31, 43 wherein a light source and a photodetector are integrated as one body. Further, a phase shift element 137, a wavelength plate 136 and a polarizing hologram 135 are integrated as one body. FIGS. 17 and 18 show an optical system of the optical head. FIG. 17 shows a situation for recording and reproduction to and from an optical disk 10 of plate thickness 0.6 mm, while FIG. 18 shows a situation for recording and reproduction to and from an optical disk 18 of plate thickness 1.2 mm.

In FIG. 17, the first module 31 for DVD has a laser diode 31a of wavelength 650 nm and photodetectors 31b, 31c for detecting light reflected from an optical disk 10. The laser diode 31a and the photoconductors 31b, 31c are integrated as one body. A light beam 32 of wavelength 650 nm emitted from the laser diode 31a transmits a cover glass 31d to enter a wavelength filter 33. The wavelength filter 33 is designed to transmit light of wavelength 650 nm and to reflect light of wavelength 780 nm. Thus, the light beam 32 transmits the wavelength filter 33 and is collimated by a condenser lens 34 to become a generally collimated light beam. The collimated light beam 32 transmits a polarizing hologram 135, a wavelength plate 136 and a phase shift element 137 as an optical plate element and enters the object lens 108 of numerical aperture 0.6.

The polarizing hologram 135, the wavelength plate 136 and the phase shift element 137 are integrated as one body, and they are fixed with the object lens 138 to a holder 139 for the object lens 138. As shown in FIG. 10, the polarizing hologram 135 is fabricated by forming a hologram in a LiNb plate made of a birefringence material with proton exchange. It transmits extraordinary light and diffracts ordinary light. The light beam 32 is handled as extraordinary light by the polarizing hologram 135, and it transmits the polarizing hologram 135 without diffraction. The wavelength plate 136 converts light of wavelength 650 nm from linear polarization to generally circular polarization, while it does not change polarization for light of wavelength 780 nm. Thus, the light beam 32 is converted to circular polarization.

Figure 19:
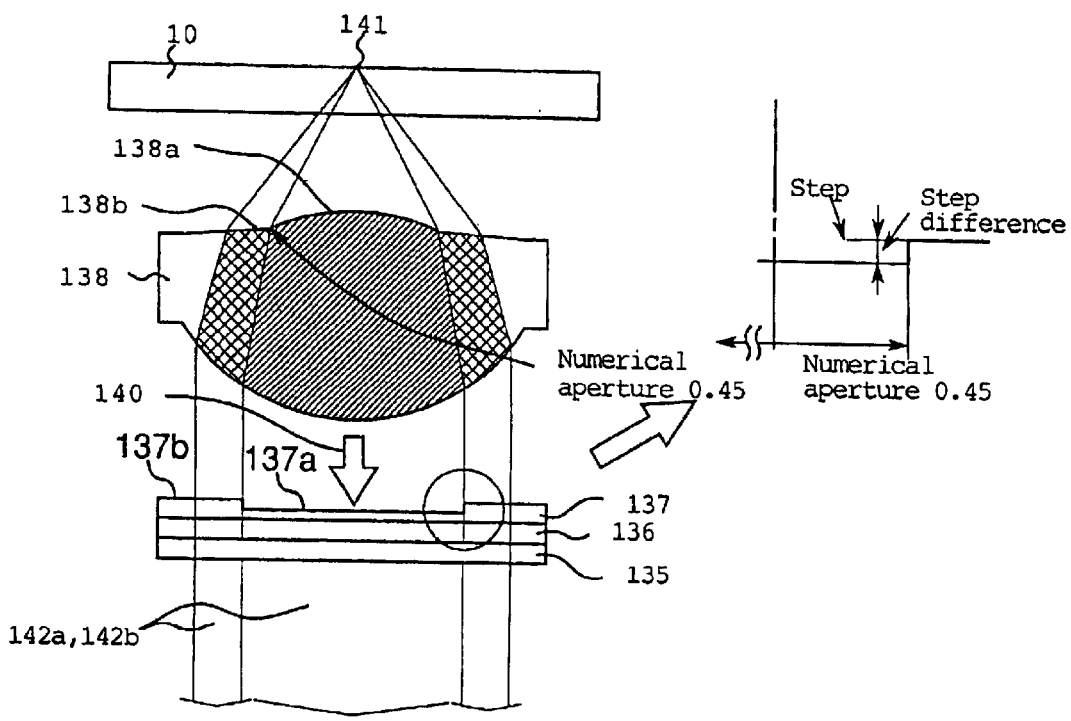
FIG. 19 is a diagram of an object lens and a phase shift element in the optical system of optical head according the fourth embodiment of the invention.
Figure 20:
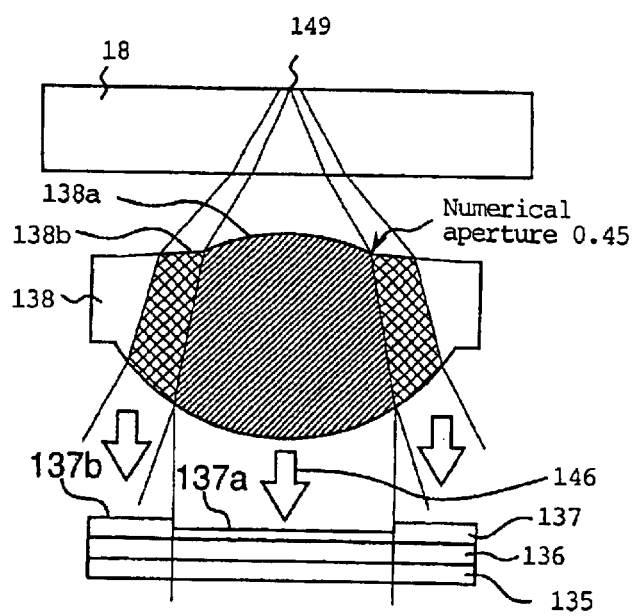
FIG. 20 is another diagram of the object lens and the phase shift element in the optical system of optical head according the fourth embodiment of the invention.

Similarly to the object lens 108 in the third embodiment, the object lens 38 is designed to have double optimum plate thicknesses. As shown in FIGS. 19 and 20, a central portion 138a of numerical aperture equal to or smaller than 0.45 is designed to have minimum aberration for a disk plate thickness 0.9 mm while an outer portion 108b of numerical aperture equal to or larger than 0.45 is designed to have minimum aberration for a disk plate thickness 0.6 mm. The light beam 32 is converged by the object lens 138 to form a light spot 141 on an information plane in the optical disk 10 of plate thickness 0.6 mm.

The light 140 reflected by the optical disk 10 is condensed by the object lens 138, passes the phase shift element 137 and is converted by the wavelength plate 136 from circular polarization to linear polarization in polarization direction perpendicular to polarization plane of the light beam 32. Because the reflected light 140 enters the polarizing hologram 135 as ordinary light, it is diffracted thereby. On the diffraction, the reflected light is divided to a diffracted light 142a for detecting focus signal and another 142b for detecting tracking signal. The diffracted lights 142a, 142b are narrowed by a condenser lens 34 to enter the photodetectors 31b, 31c, and reproduction signals are detected by one or both of the photodetectors. Further, the photodetector 31b detects a focus control signal for making the object lens 37 follow the information plane with spot size detection technique and the photodetector 31c detects a tracking control signal for tracking an information track with phase difference technique or push-pull technique.

On the other hand, the second module 43 for CD has a laser diode 43a of wavelength 780 nm, a hologram 43d for separating the reflected light to give spacial change and photodetectors 43b, 43c for detecting reflected light from an optical disk 10, and the laser diode 43a, the hologram 43d and the photoconductors 43b, 43c are integrated as one body. In FIG. 18, a part of a light beam 44 of wavelength 780 nm emitted from the laser diode 43a transmits the hologram 43d to enter the wavelength filter 33. Because the wavelength filter 33 reflects light of wavelength 780 nm, the light beam 44 is reflected by the wavelength filter 33 and collimated by a condenser lens 34. The collimated light beam 44 transmits the polarizing hologram 135, the wavelength plate 136 and the phase shift element 137 and enters the object lens of numerical aperture 0.6. The polarizing hologram 32 handles the light beam 44 as extraordinary light, and the light beam 44 transmits it without diffraction. The wavelength plate 44 does not change the polarization direction for light of wavelength 780 nm, so that the polarization plane of the light beam 44 is maintained. The light beam 44 is focused by the object lens 44 and forms a light spot 149 on an information plane in an optical disk 18 of plate thickness 1.2 mm.

The light 146 reflected by the optical disk 18 is collected by the object lens 138 and transmits the phase shift element 137, the wavelength plate 136 and the polarizing hologram 135. Because the wavelength plate 136 does not change polarization direction for light of wavelength 780 nm, the reflected light 146 transmits the wavelength plate 136 as linear polarization, similarly to the light beam 44. Because the reflected light 146 enters the polarizing hologram 135 as extraordinary light, it is not diffracted. The light 146 transmitting the polarizing hologram 135 is narrowed by the condenser lens 34 and is reflected by the wavelength filter 33 to enter the second module 43. The reflected light 46 entering the second module 43 is diffracted by the hologram 43d to enter the photodetectors 43b and 43c, and reproduction signals are detected by one or both of the photodetectors. Further, the photodetector 43b detects a focus control signal for making the object lens 37 follow the information plane with spot size detection technique and the photodetector 43c detects a tracking control signal for tracking an information track with phase difference technique or push-pull technique. Further, the object lens 138 and the phase shift element 137 are fixed so as to keep dynamical balance relative to a center of gravity 153 of a moving device comprising the object lens holder 139 having a drive means movable in focus direction as optical axis of the object lens and in tracking direction as a radial direction of the disk.

In the above-mentioned structure using two wavelengths 650 and 780 nm, when a CD is reproduced with light of wavelength 780 nm, the numerical aperture of the central portion 138a of the object lens 138 is increased similarly to the third embodiment, and as shown in FIG. 11, a step is provided at a boundary between the outer portion and the inner portion of the object lens 137. Thus, the fifth spherical aberration component in the aberration components of the light spot 140 formed after transmitting the object lens 138 is decreased, and the side lobes of the light spot 149 are reduced, to improve the recording and reproduction performance. In order to suppress the fifth aberration equal to or smaller than 20 mλ (rms), it is preferable that the phase shift is in a range between 50 and 150 degrees. When the phase step is changed, the total aberration is not changed much. In this embodiment, the step is set to an amount in correspondence to 125 degrees of phase difference.

On the other hand, when the optical disk 18 of plate thickness 1.2 mm such as CD is used for recording or reproduction, the range of numerical aperture of 0.45 of the object lens 138 is set for the optimum design plate thickness 0.9 mm, so that the aberration of the light transmitting it is suppressed to a similar order to the prior art structure. As shown in FIG. 20, the light beam transmitting the outer portion 138b of the object lens 138 has large spherical aberration and is diverged in a relatively wide range in the information plane in an optical disk 18, and the reflected light also is diverged with large spherical aberration. Therefore, the reflected light of the light transmitting the outer portion 138b does not enter the photodetectors 43a, 43c generally. Then, without providing a means for limiting numerical aperture, CD reproduction becomes possible at numerical number 0.45.

As explained above, the phase shift element 137 has the optical step added to the optical plate element. In the third embodiment, the phase shift element 137 is provided separately, while in the fourth embodiment, the phase shift element 137 is integrated with the polarizing hologram and the phase shift element. As to the two cases, the phase shift element having the optical step can be fabricated, for example, by forming a step with etching or with molding of transparent resin. Alternatively, instead of the step, a similar function can be obtained by depositing an anisotropic film of a different refractive index. Alternatively, a step (difference in level) or a film of different refractive index is formed on one of the planes of the polarizing hologram. Needless to say, it may also be formed on the wavelength plate.

The phase shift element has a simple structure that the phase of light beam is changed by the step or the film of different refractive index, so that it is easy to optimize the phase shift. Therefore, optimization for each optical head in various models is easily performed, and development period can be shortened to a large extent.

In the above-mentioned third and fourth embodiments, two light sources are used, and light beams of different wavelengths are used for recording and reproduction for optical disks of transparent disks of different thicknesses. However, for an optical head using a light beam of one wavelength, an object lens having an inner region and an outer region and a phase shift element having an inner region and an outer region can be used similarly to the above embodiments, so as to improve performance of recording and reproduction for two types of optical information recording media.

Next, advantages of the third and fourth embodiments are explained. In these embodiments, an optical head can be used for CD reproduction as well as for DVD reproduction, by increasing NA for CD reproduction and by using a laser of 780 nm. The compatibility for CD and DVD can be realized with a simple optical head including one optical head. Further, an optical head can be fabricated compactly, and an optical information recording and reproducing apparatus can be fabricated compactly and simply.

Further, the means for shifting phase is realized by a simple technique to shift the phase of light beam by forming the step or by depositing the film of different refractive index, so that it is easy to optimize the phase shift. Therefore, optimization for each optical head in various models is easily performed, and development period can be shortened to a large extent.

Because the dynamical balance of the object lens and the phase shift element is kept relative to the center of gravity of the movable device, even when a balancer or the like is not used, distortion relative to the optical axis of the object lens 108 is small. Therefore, an optical head and an information recording and reproducing apparatus have good quality of signals on recording and on reproduction.

Figure 21:
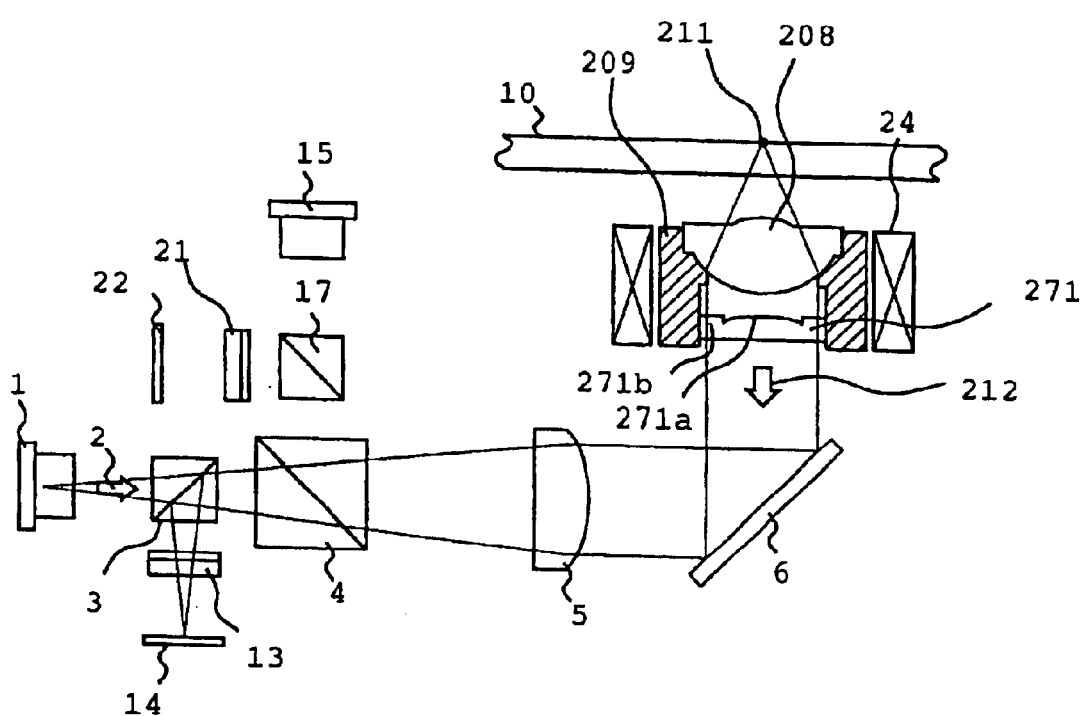
FIG. 21 is a diagram of an optical system according a fifth embodiment of the invention.
Figure 22:
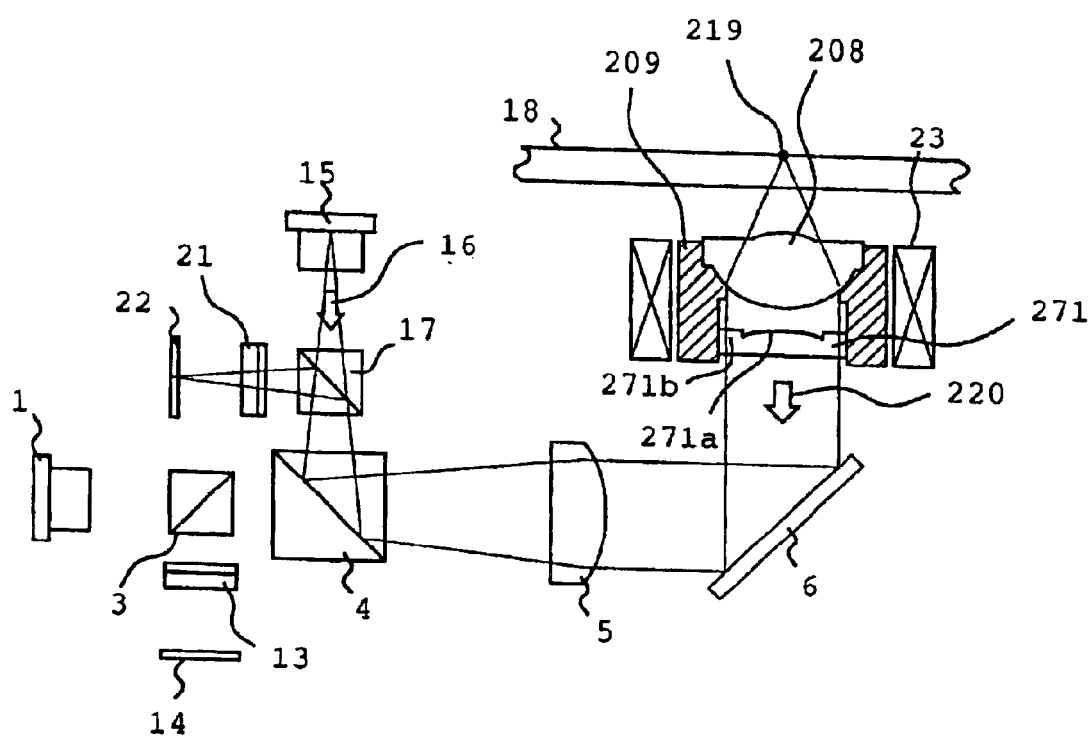
FIG. 22 is another diagram of the optical system according the fifth embodiment of the invention.
Figure 23:
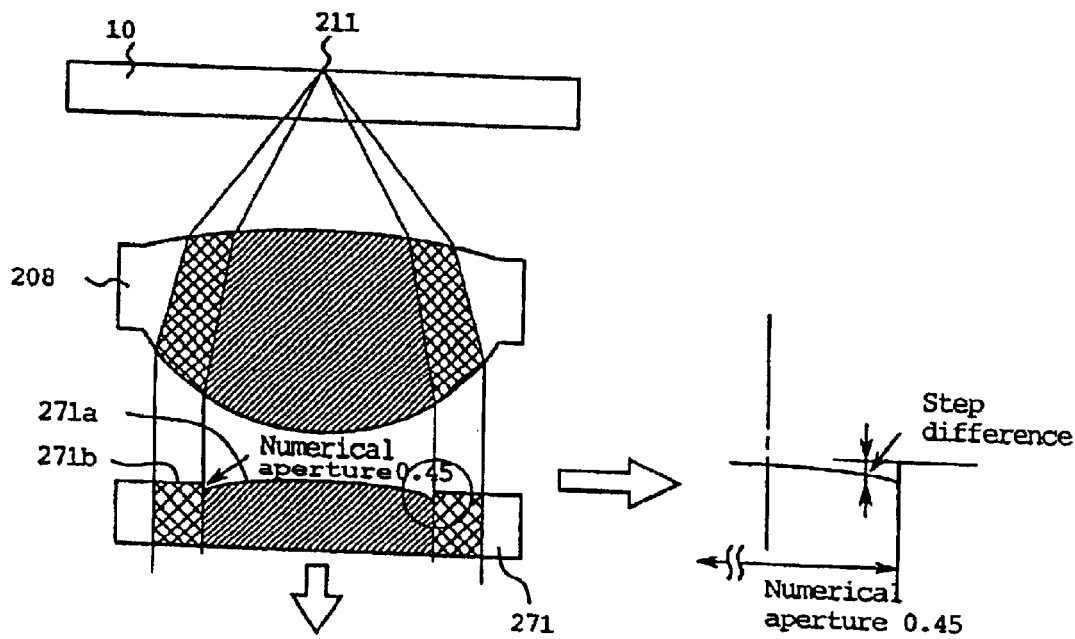
FIG. 23 is a diagram of a structure around an object lens and a phase shift element according the fifth embodiment of the invention.
Figure 24:
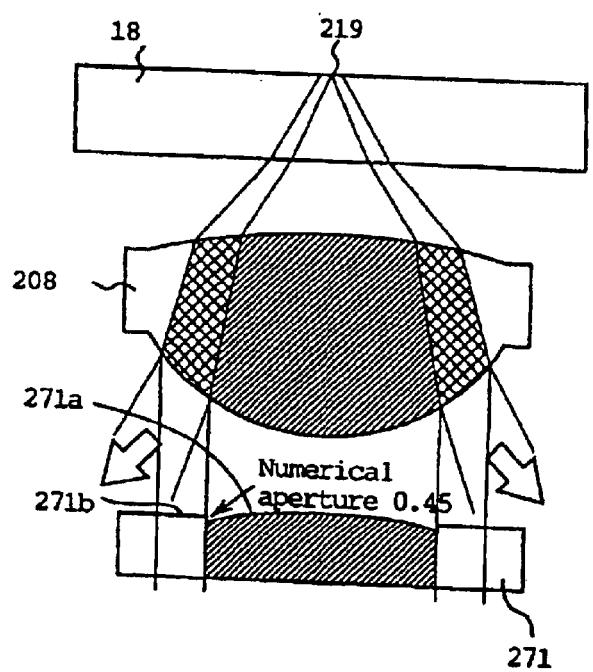
FIG. 24 is another diagram of the structure around the object lens and the phase shift element according the fifth embodiment of the invention.

Next, a fifth embodiment of the invention is explained with reference to FIGS. 21 to 24. FIGS. 21 and 22 show an optical system of optical head according the fifth embodiment of the invention. FIG. 21 shows a situation for recording and reproduction to and from an optical disk 10 of plate thickness 0.6 mm such as DVD, while FIG. 22 shows a situation for recording and reproduction to and from an optical disk 18 of plate thickness 1.2 mm such as CD. Further, FIGS. 23 and 24 show a structure around the object lens and the phase shift element according the fifth embodiment of the invention.

In FIG. 21, a light beam 2 of wavelength 650 nm is emitted by a laser diode 1, and about half thereof transmits a beam splitter 3 to enter a wavelength filter 4. The wavelength filter 4 is designed to transmit light of wavelength 650 nm and to reflect light of wavelength 780 nm. Then, the light beam 2 transmits the wavelength filter 4 and is collimated by a condenser lens 5 to become a generally collimated light beam. The collimated light beam 2 is reflected by a mirror 6, transmits an optical plate element 271 and enters an object lens 208 of numerical aperture 0.6. The light beam 2 transmitting the optical plate element 271 is converged by the object lens 208 to form a light spot 211 on an information plane in the optical disk 10 of plate thickness 0.6 mm. The optical plate element 271 and the object lens 208 are held as an integral body with a holder 209 for holding the object lens, and its position is controlled by a driver 23.

The light 212 reflected by the optical disk 10 is condensed by the object lens 208, passes the optical plate element 271 and the mirror 6 and is narrowed by the condenser lens 5. Then, the light beam 212 transmits the wavelength filter 4 to enter the beam splitter 3. About half of the light incident on the beam splitter 3 is reflected. Then, it transmits a cylindrical lens 13 and is received by a photodetector 14. The photodetector 14 detects not only reproduction signals, but also a focus control signal for making the object lens 208 follow the information plane with astigmatism technique and a tracking control signal for tracking an information track with phase difference technique or push-pull technique.

On the other hand, in FIG. 22, a light beam 16 of wavelength 780 nm is emitted by a laser diode 15, and about half thereof transmits a beam splitter 17 to enter the wavelength filter 4. Because the wavelength filter 4 is designed to reflect light of wavelength 780 nm, the light beam 16 is reflected by the wavelength filter 4 and is collimated by the condenser lens 5. The collimated light beam 16 passes the mirror 6, transmits the optical plate element 271 and enters the object lens 208 of numerical aperture 1.2. The light beam 2 of wavelength 780 nm is converged by the object lens 8 to form a light spot 19 on an information plane in the optical disk 18 of plate thickness 1.2 mm.

Next, the light 220 reflected by the optical disk 18 is collected by the object lens 208, transmits the optical plate element 271, is reflected by the mirror 6 and condensed by the condenser lens 5. Then, it is reflected by the wavelength filter 4 to enter the beam splitter 17. About half of the light incident on the beam splitter 17 is reflected. Then, it transmits a cylindrical lens 21 and is received by a photodetector 22. The photodetector 22 detects not only reproduction signals, but also the focus control signal with astigmatism technique and the tracking control signal with phase difference technique or push-pull technique.

Here, the optical plate element 271 and the object lens 208 are explained in detail. The object lens 208 is designed so that aberration becomes minimum for disk plate thickness 0.6 mm for all the portion of NA equal to or smaller than 0.6 when only the object lens 208 is used without associated with the optical plate element 271. That is, it has a plane optimized to converge the light beam transmitting the object lens 208 onto an optical disk of thin transparent plate. Then, the object lens 208 can be use for an optical head for recording or reproducing to and from an optical disk of plate thickness 0.6 mm.

On the other hand, the optical plate element 271 has the inner region 271a near the central axis of light beam and the outer region 271b far from the central axis. In an optical head which uses two wavelengths 650 and 780 nm, when a disk of plate thickness 0.6 mm is reproduced with light of wavelength 780 nm, NA of the inner region 271a of the optical plate element 271 has to be set to about 0.45. However, when NA of optimum design plate thickness 0.9 mm becomes 0.45, aberration exceeding 80 mλ rms is generated in the light spot 211 for recording or reproduction of a DVD. Usually a light spot having aberration larger than 80 mλ rms has large so-called side lobes, so that recording and reproduction performance is deteriorated. Therefore, if the light source of 780 nm is added and only the numerical aperture of the central portion is increased in the prior art structure, the performance is not satisfactory. In this embodiment, as shown in FIG. 23, the numerical aperture of the inner region 271a of the optical plate element 271 is increased, and a step is provided at a boundary between the inner region 271a and the outer region 271b of the optical plate element 271. Then, Zernike's fifth spherical aberration component in the aberration components is decreased, and the side lobes of the light spot are reduced, to improve the recording and reproduction performance. In this embodiment, the amplitude of the step is set to 125 degrees of phase difference.

The optical plate element 271 is designed to have a plane which minimizes aberration for a transparent flat plate of disk plate thickness 0.9 mm when cooperated with the object lens 271 when it is cooperated with the object lens 208. The plane of the inner region of the optical plate element 271 has a plane optimized to converge the light beam transmitting the inner region 271a onto an optical disk of thinner transparent plate among a plurality of optical disks. Such a transparent plate is, for example, a transparent plate having thickness equal to or larger than t1*0.7 wherein t1 denotes the thickness of transparent plate having the largest thickness in a plurality of types of optical disks (1.2 mm in this example). On the other hand, the outer region 271b of NA equal to or larger than 0.45 has a flat plane, and it only gives phase shift determined by a product of the thickness of the outer region 271b and the refractive index of the optical plate element 271. Further, the phase of the outer region is set so that the phase of the beam transmitting the innermost portion of the outer region is set to be shifted relative to the phase of the beam transmitting the outermost portion of the inner region. The optical plate element 271 is made of glass, and the shape of its surface is obtained by etching the surface of a flat glass sheet.

A relationship between the above-mentioned step (converted to the phase of the light of wavelength 650 nm) and the aberrations is similar to that shown in FIG. 5 on the first embodiment, and values of the step and the side lobes are similar generally to those in the graph shown in FIG. 6. By setting the phase step to an appropriate value, the fifth spherical aberration is decreased, and side lobes can be reduced. In order to suppress the fifth aberration below 20 mλ (rms), it is also found that it is necessary to set the phase shift between 50 and 150 degrees. When the amplitude of the phase step is changed, total aberration is not affected much.

On the other hand, when an optical disk 18 of plate thickness 1.2 mm such as CD is used for recording or reproduction, the aberration of the light beam transmitting the range of NA 0.45 of the optical plate element 271 is suppressed to a similar degree to that of prior art by setting the range to optimum design plate thickness 0.9 mm. As shown in FIG. 24, because the light beam transmitting the outer region 271a of the optical plate element 271 transmits the object lens 208 wholly, it has large aberration and is dispersed in a relatively wide range on the information plane in the optical disk 271. Further, the reflected light transmitting the outer region 271b is also dispersed with large spherical aberration. Then, the reflected light transmitting the outer region 271b does not enter the photodetector 22 substantially, and a disk of plate thickness 1.2 mm can be reproduced with NA 0.45 without providing a means for limiting the aperture.

Figure 25:
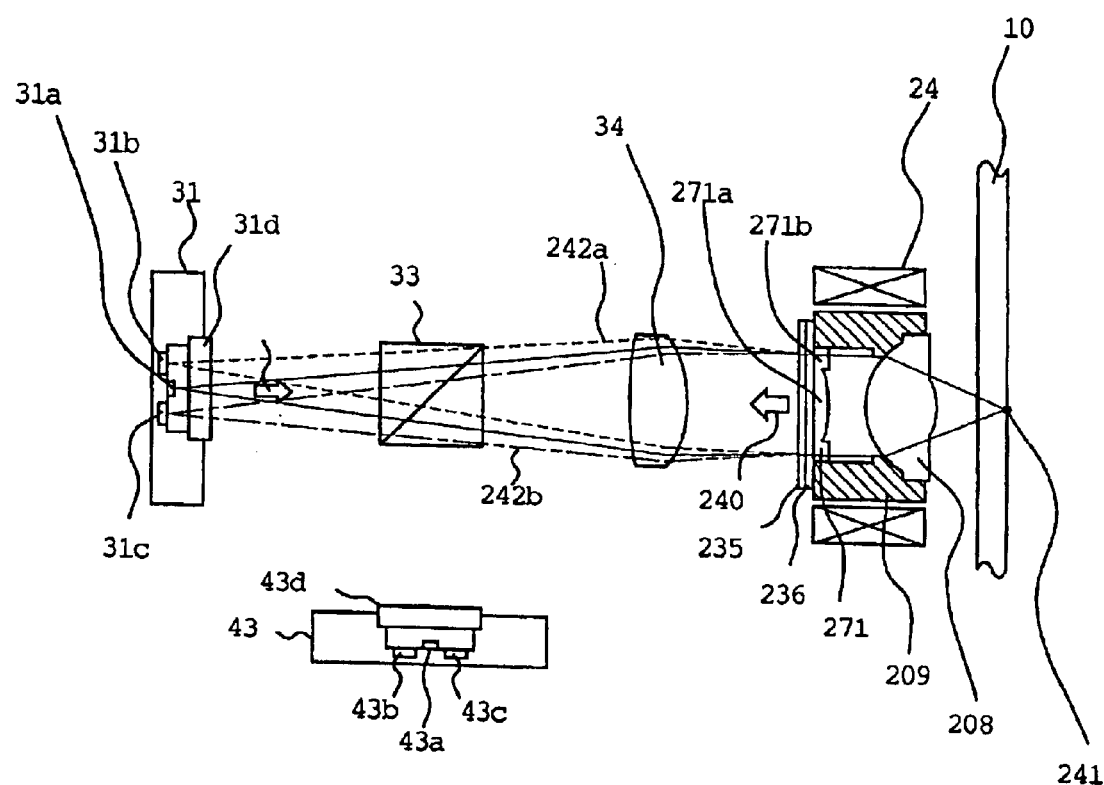
FIG. 25 is a diagram of an optical system according a sixth embodiment of the invention.
Figure 26:
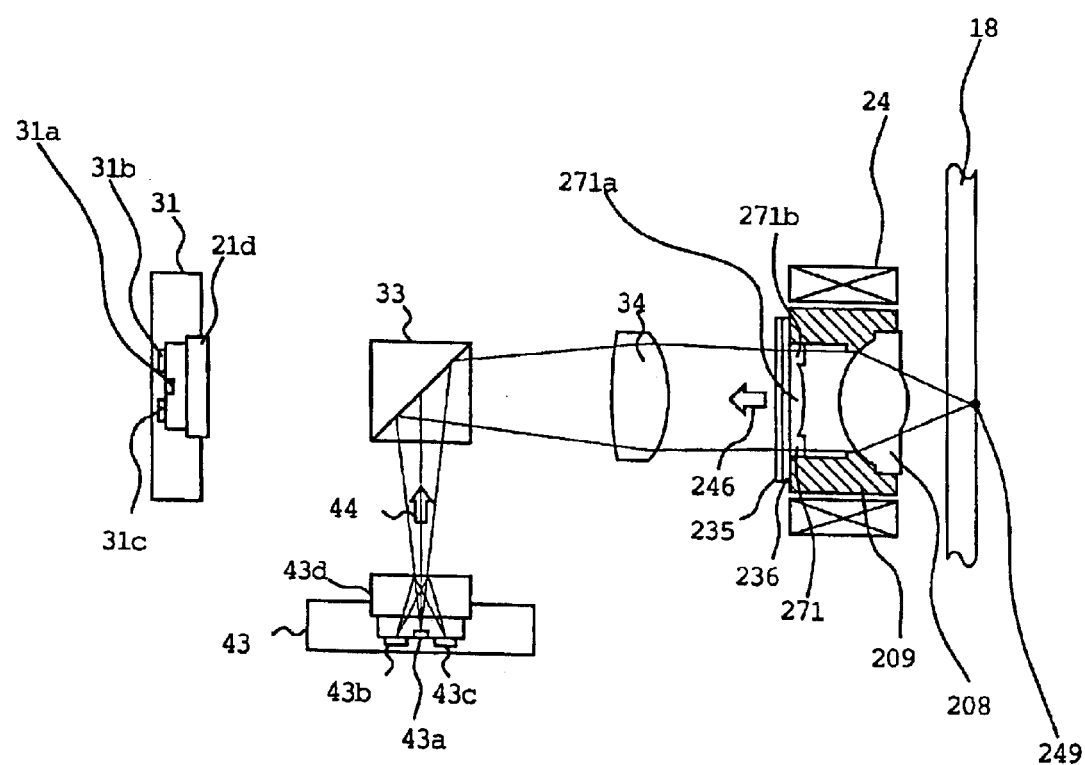
FIG. 26 is another diagram of the optical system according the sixth embodiment of the invention.
Figure 27:
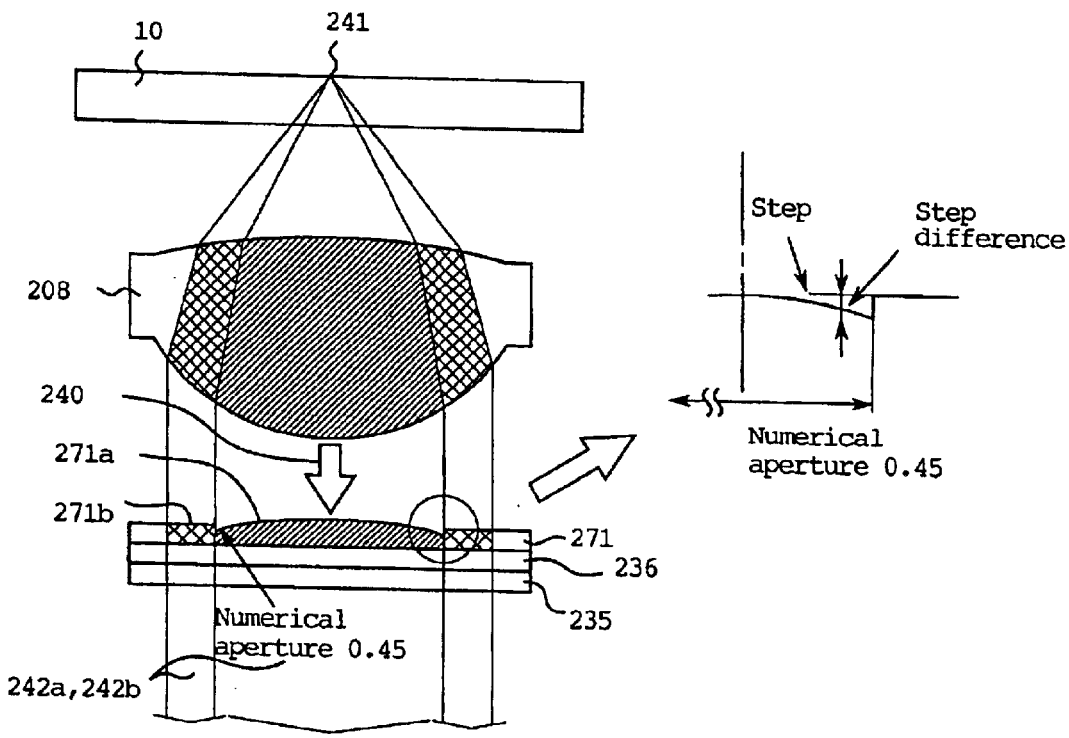
FIG. 27 is a diagram of a structure around an optical plate element and an object lens according the sixth embodiment of the invention.
Figure 28:
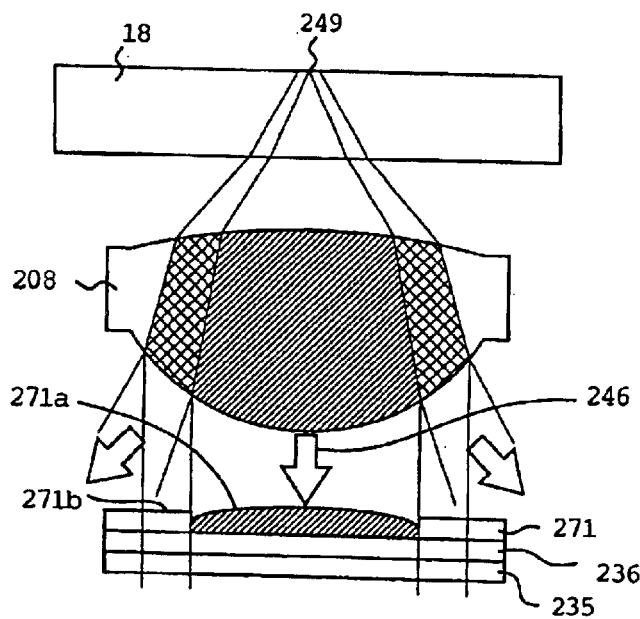
FIG. 28 is another diagram of the structure around the optical plate element and the object lens according the sixth embodiment of the invention.

Next, a sixth embodiment of the invention is explained with reference to FIGS. 25 to 28. FIGS. 25 and 26 show an optical system of optical head according to the sixth embodiment of the invention. FIG. 25 shows a situation for recording and reproduction to and from an optical disk of plate thickness 0.6 mm such as DVD, while FIG. 26 shows a situation for recording and reproduction to and from an optical disk of plate thickness 1.2 mm such as CD. Further, FIGS. 27 and 28 show details around the object lens and the phase shift element.

Recording and reproduction to and from an optical disk 18 of plate thickness 1.2 mm such as CD are explained. In FIG. 27, a first module 31 for DVD comprises a laser diode 31a of wavelength 650 nm integrated as one body with photodetectors 31b and 31c for receiving light reflected from the optical disk 10. A light beam 32 of wavelength 650 nm emitted by the laser diode 31a in the first module 31 transmits a cover glass 31d to enter a wavelength filter 33. The wavelength filter 33 transmits light of 650 nm and reflects light of wavelength 780 nm. Thus, the light beam 32 transmits the wavelength filter 33 and is collimated by a condenser lens 34 to become a generally collimated light beam. The collimated light beam 32 transmits a polarizing hologram 235 and a wavelength plate 235 to enter an object lens 208 of numerical aperture 0.6.

The polarizing hologram 235 and the wavelength plate 236 are integrated as one body, and they are fixed to a holder 209 with the object lens 208. As shown in FIG. 10, the polarizing hologram 235 is fabricated by forming a hologram in a LiNb plate made of a birefringence material with proton exchange. It transmits extraordinary light and diffracts ordinary light. The light beam 32 is handled as extraordinary light by the polarizing hologram 235 and it transmits the polarizing hologram 235 without diffraction. The wavelength plate 236 converts light of wavelength 650 nm from linear polarization to generally circular polarization, but it does not change polarization for light of wavelength 780 nm. Thus, the light beam 32 is converted to circular polarization by the wavelength plate 236. The light beam of circular polarization transmits the optical plate element 271 and is converged by the object lens 208 to form a light spot 241 on an information plate in an optical disk 10 of plate thickness 0.6 mm.

The object lens 208 and the optical plate element 271 are designed similarly to the counterparts in the fifth embodiment. The object lens 208 is designed so that aberration becomes minimum for the portion of NA equal to or smaller than 0.45 for an optical disk of plate thickness 0.6 mm when it is used without cooperated with the optical plate element 271. On the other hand, the optical plate element 271 comprises an inner region 271a near the optical axis and an outer region 271b far therefrom. The numerical aperture of the inner region 271a is increased, while a step is provided between the inner and outer regions 271a, 271b. The amplitude of the step is set to 125 as phase step.

Next, the light 240 reflected by the optical disk 10 is condensed by the object lens 208, transmits the optical plate element 271, is converted by the wavelength plate 236 from the circular polarization to linear polarization having a polarization direction perpendicular to a polarization plane of the light beam 32 and enters the polarizing hologram 235. Because the reflected light 240 enters the polarizing hologram 235 as ordinary light, it is diffracted. The diffraction divides the reflected light 240 into diffracted light 242a for detecting focus signal and diffracted light 242b for detecting tracking signal. The diffracted lights 242a and 242b are narrowed by the condenser lens 34 to be received by the photodetectors 31b and 31c, respectively, and reproduction signals are detected by one or both of the photodetectors. Further, the photodetector 31b detects a focus control signal for making the object lens 208 follow the information plane with spot size detection technique and the photodetector 31c detects a tracking control signal for tracking an information track with phase difference technique or push-pull technique.

On the other hand, a second module 43 for CD comprises a laser diode 43a of wavelength 780 nm, a hologram 43d for separating reflected light from an optical disk to give spacial change and photodetectors 43a, 43b which detects the reflected light, and they are integrated as one body. In FIG. 25, a part of a light beam 44 of wavelength 780 nm emitted by the laser diode 43a transmits the hologram 43d and enters the wavelength filter 33. Because the wavelength filter 33 transmits light of 650 nm and reflects light of wavelength 780 nm, the light beam 44 is reflected by the wavelength filter 33 and is collimated by the condenser lens 34. The collimated light beam 44 transmits the polarizing hologram 235 and the wavelength plate 236 to enter the object lens of numerical aperture 0.6. The light beam 44 is handled as extraordinary light by the polarizing hologram 235 and it transmits the polarizing hologram 235 without diffraction. Because the wavelength plate 236 does not convert polarization direction of light of wavelength 780 nm, the polarization plane of the light beam 44 is maintained. Thus, the light beam 44 is focused by the object lens 208 to form a light spot 249 on an information plane in the optical disk 18 of plate thickness 1.2 mm.

Next, the light 246 reflected by the optical disk 18 is condensed by the object lens 208 and transmits the wavelength plate 236 and the polarizing hologram 235. Because the wavelength plate 236 does not change polarization direction for light of wavelength 780 mm, the reflected light 246 transmits the wavelength plate 236 as linear polarization, similarly to the light beam 44. Because the reflected light 246 enters the polarizing hologram 235 as extraordinary light, it is not diffracted. The light 246 transmitting the polarizing hologram 235 is narrowed by the condenser lens 34 and is reflected by the wavelength filter 33 to enter the second module 43. The reflected light 246 entering the second module 43 is diffracted by the hologram 43d to enter the photodetectors 43b and 43c, and reproduction signals are detected by one or both of the photodetectors. Further, the photodetector 43b detects a focus control signal for making the object lens 208 follow the information plane with spot size detection technique and the photodetector 43c detects a tracking control signal for tracking an information track with phase difference technique or push-pull technique.

By setting the phase step to an appropriate value, the fifth spherical aberration is decreased, and side lobes can also be reduced, similarly to the fifth embodiment as explained above with reference FIGS. 5 and 6. In order to suppress the fifth aberration below 20 mλ (rms), it is also found that it is necessary to set the phase shift between 50 and 150 degrees. When the amount of the phase step is changed, total aberration is not affected much.

On the other hand, when an optical disk 18 of plate thickness 1.2 mm such as CD is used for recording or reproduction, the aberration of the light beam transmitting the range of NA 0.45 of the optical plate element 271 is suppressed to a similar degree to that of prior art by setting the range to optimum design plate thickness 0.9 mm. As shown in FIG. 28, because the light beam transmitting the outer region 271a of the optical plate element 271 transmits the object lens 208 wholly, it has large aberration and is dispersed in a relatively wide range on the information plane in the optical disk 271. Further, the reflected light transmitting the outer region 271b is also dispersed with large spherical aberration. Then, the reflected light transmitting the outer region 271b does not enter the photodetector 22 substantially, and a disk of plate thickness 1.2 mm can be reproduced with NA 0.45 without providing a means for limiting the aperture.

In the fifth and sixth embodiments, the optical plate element 271 is fabricated by etching a glass plate, but it may also be fabricated by forming glass with a press. Because the lens effect of the optical plate element 271 is weak, a resin of low refractive index may be used. Therefore, injection molding or press forming for resin may also be adopted similarly.

According to the fifth and sixth embodiments, a necessary function can be added to an object lens by providing the optical plate element in the optical path. Further, this is a means for realizing a form difficult to be added as an object lens, and an optical head or an optical disk drive having a desired condensing performance can be provided easily.

Further, because the optical plate element has a simple structure fabricated by etching on a generally plate-like surface, its shape can easily be optimized. Therefore, optimization or the like for each model of optical head can easily be performed by using a common object lens, and a period for development can be shortened to a large extent. The optical plate element is also appropriate for production in small lots.

Further, because the optical plate element and the object lens are separate parts, the shape of the object lens can be simplified. A glass lens advantageous for change in ambient temperature can be adopted easily.

By adopting the above-mentioned structure, the reproduction performance for an information recording medium of small thickness such as DVD can be kept, while numerical aperture for an information recording medium of large thickness such as DVD can be increased.

Further, because the numerical aperture for an information recording medium of large thickness can be increased, the information recording medium of large thickness can be reproduced with a light source of longer wavelength. For example, reproduction becomes possible even for an information recording medium such as CD-R which cannot reproduce information due to low reflectance with use of a light source for a wavelength for reproduction of an information recording medium of smaller thickness.

In the above-mentioned first to sixth embodiments, the range of optimum design plate thickness 0.9 mm is set to NA 0.45 as an example for compatibility between DVD and CD. Further, it is possible to extend the range further to about 0.50 for the compatibility between DVD and laser disk (LD).

Figure 29:
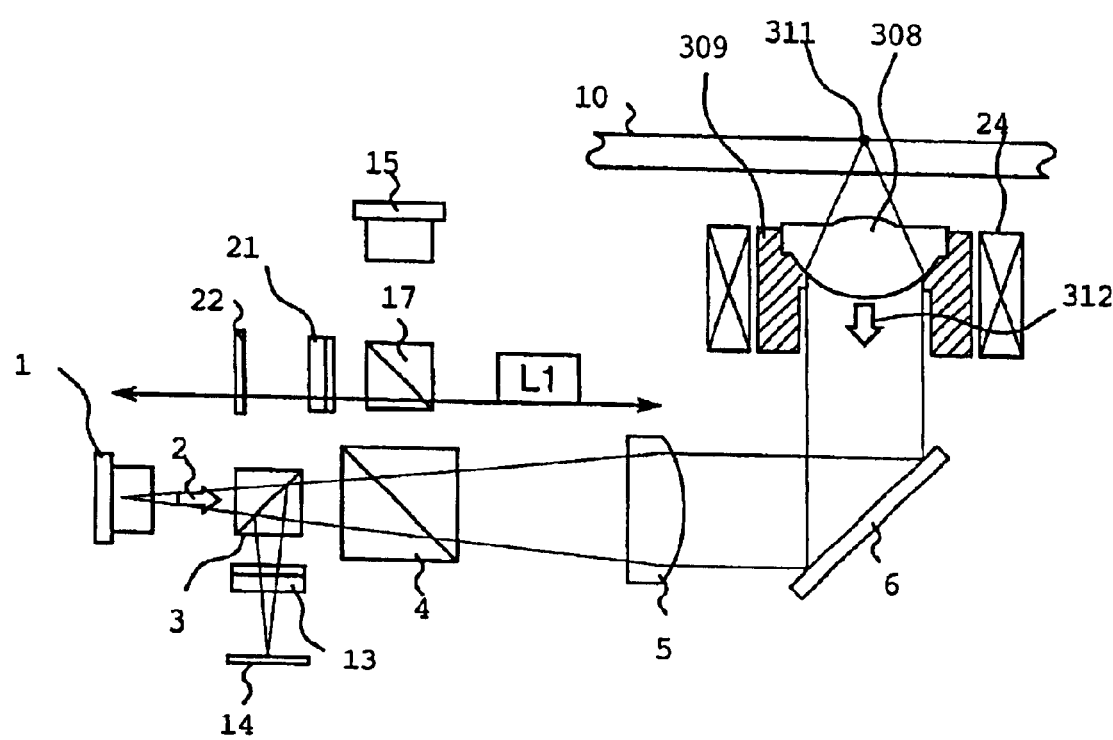
FIG. 29 is a diagram of an optical system of optical head according a seventh embodiment of the invention.
Figure 30:
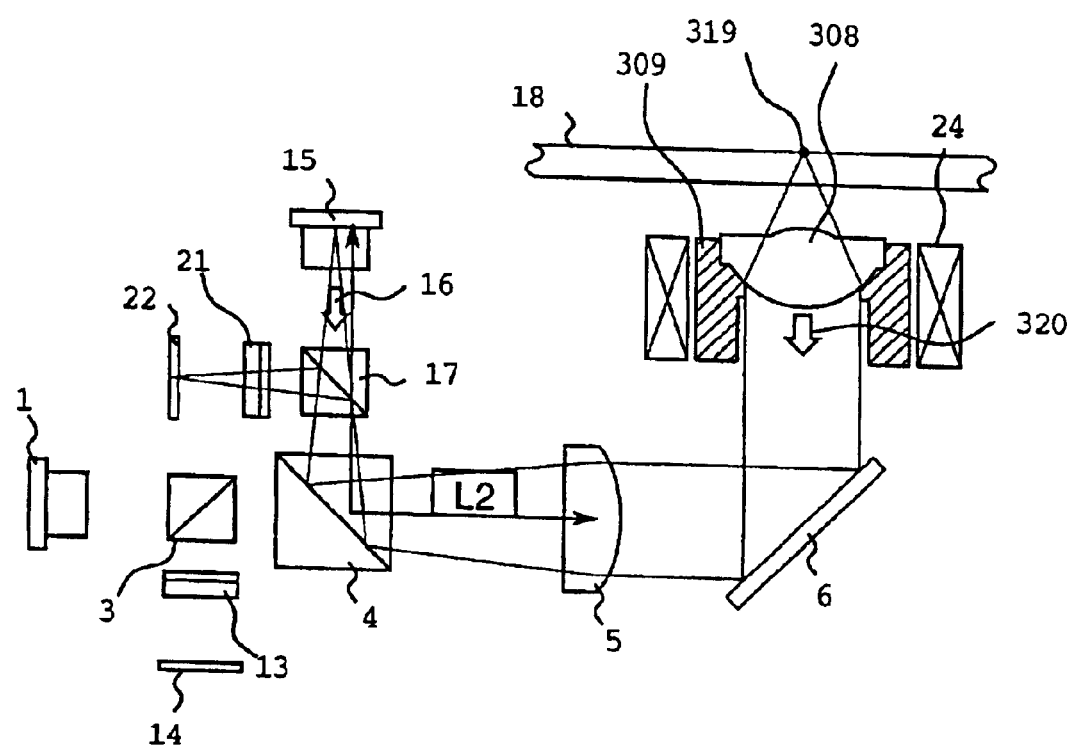
FIG. 30 is another diagram of the optical system of optical head according the seventh embodiment of the invention.
Figure 31:
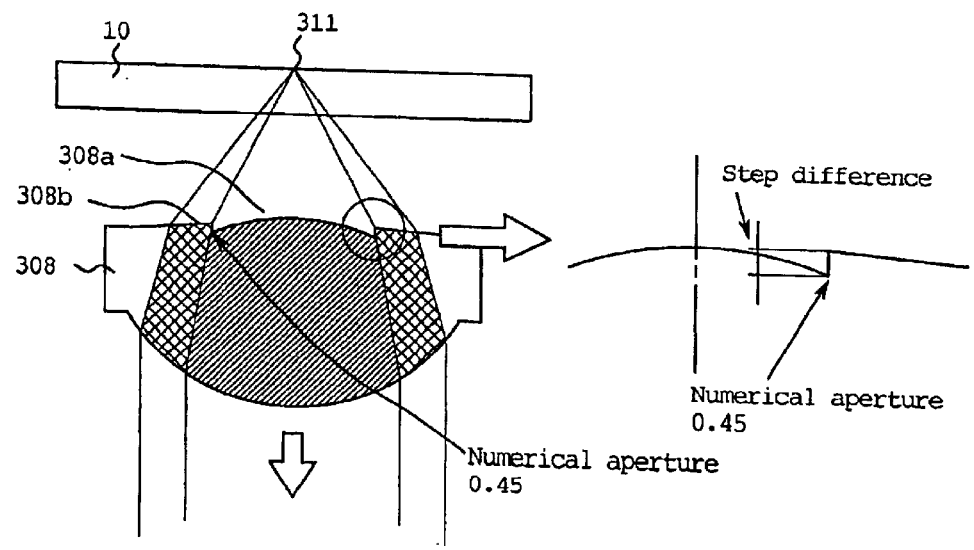
FIG. 31 is a diagram of an object lens in the optical system of optical head.

Next, a seventh embodiment of the invention is explained with reference to relevant drawings. FIGS. 29 and 30 show an optical system of optical head according to the seventh embodiment. FIG. 29 shows a situation for recording and reproduction to and from an optical disk 10 of plate thickness 0.6 mm, while FIG. 30 shows a situation for recording and reproduction to and from an optical disk 18 of plate thickness 1.2 mm.

In FIG. 29, a light beam 2 of wavelength 650 nm is emitted by a laser diode 1, and about half thereof transmits a beam splitter 3 to enter a wavelength filter 4. The wavelength filter 4 is designed to transmit light of wavelength 650 nm and to reflect light of wavelength 780 nm. Then, the light beam 2 transmits the wavelength filter 4 and is collimated by a condenser lens 5 to become a generally collimated light beam. The collimated light beam 2 is reflected by a mirror 6 and enters an object lens 308 of numerical aperture 0.6. The object lens 308 comprises a central portion 308a and an outer portion 308b. The central portion 308a is designed so that a central portion 308a of numerical aperture equal to or smaller than 0.45 has minimum aberration for a disk plate thickness 0.9 mm while an outer portion 308b of numerical aperture equal to or larger than 0.45 has minimum aberration for a disk plate thickness 0.6 mm. The light beam 2 is converged by the object lens 308 to form a light spot 311 on an information plane in the optical disk 10 of plate thickness 0.6 mm.

Next, the light 312 reflected by the optical disk 10 is condensed by the object lens 308, passes a mirror 6 and is narrowed by a condenser lens 5. The narrowed reflected light 312 transmits a wavelength filter 4 to enter a beam splitter 17. About half of the light incident on the beam splitter 17 is reflected. Then, the reflected light transmits a cylindrical lens 13 and is received by a photodetector 14. The photodetector 14 detects not only reproduction signals, but also a focus control signal for making the object lens 308 follow the information plane with astigmatism technique and a tracking control signal for tracking an information track with phase difference technique or push-pull technique.

On the other hand, in FIG. 30, a light beam 16 of wavelength 780 nm is emitted by a laser diode 15, and about half thereof transmits a beam splitter 17 to enter the wavelength filter 4. The wavelength filter 4 is designed to reflect light of wavelength 780 nm. Then, the light beam 16 is reflected by the wavelength filter 4 and is collimated by the condenser lens 5. The collimated light beam 16 passes the mirror 6 and enters the object lens 308. The light beam 16 of wavelength 780 nm is converged by the object lens 308 to form a light spot 319 on an information plane in the optical disk 18 of plate thickness 1.2 mm.

Next, the light 320 reflected by the optical disk 18 is collected by the object lens 308, passes the mirror 6 and is condensed by the condenser lens 5. Then, it is reflected by the wavelength filter 4 to enter the beam splitter 17. About half of the light incident on the beam splitter 17 is reflected. Then, it transmits a cylindrical lens 21 and is received by a photodetector 22. The photodetector 22 detects not only reproduction signals, but also the focus control signal with astigmatism technique and the tracking control signal with phase difference technique or push-pull technique.

In the above-mentioned structure using two wavelengths 650 and 780 nm, when a CD is reproduced with light of wavelength 780 nm, the numerical aperture of the central portion 308a of the object lens 308 has to be decreased to about 0.45. However, if the numerical aperture of optimum design plate thickness 0.9 mm becomes 0.45, the light spot 11 for recording and reproduction of DVD generates aberration larger than 80 m$\lambda$ rms. Usually a light spot having aberration larger than 80 m$\lambda$ rms has large so-called side lobes, so that recording and reproduction performance is deteriorated. Therefore, if the light source of 780 nm is added and only the numerical aperture of the central portion 308a is increased in the prior art structure, the performance is not satisfactory. Then, in this embodiment, as shown in FIG. 30, a step is provided at a boundary between the outer and inner portions of the object lens 308 to decrease Zernike's fifth spherical aberration component in the aberration components. Thus, the side lobes of the light spot 311 are reduced to improve the recording and reproduction performance.

The relationship between step (converted to phase of light of wavelength 650 nm) in the object lens and spherical aberration of converging spot and the relationship between step height in the object lens and side lobe (wherein the main lobe is displayed to have amplitude of 100%) are similar to the graphs shown in FIGS. 5 and 6 in the first embodiment. It is apparent that by setting an appropriate value of the phase step, the fifth spherical aberration can be decreased and the side lobes can be reduced. In order to suppress the fifth aberration equal to or smaller than 20 m$\lambda$ (rms), it is preferable that shift of the phase is in a range between 50 and 150 degrees. When the phase is changed, the total aberration is not changed much. In this embodiment, amplitude of the step is set to an amount in correspondence to 100 degrees of phase difference.

Figure 32:
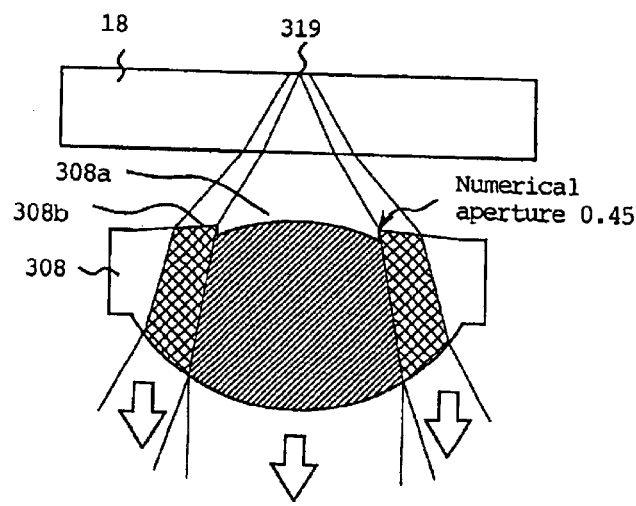
FIG. 32 is another diagram of the object lens in the optical system of optical head.

On the other hand, when the optical disk 18 of plate thickness 1.2 mm such as CD is used for recording or reproduction, the range of numerical aperture of 0.45 of the object lens 308 is set for the optimum design plate thickness 0.9 mm, so that the aberration of the light transmitting it is suppressed to a similar order to the prior art structure. However, it is preferable for suppression of aberration that optical length L2 from the laser diode 15 to the condenser lens 5 is set to a value between 80 and 95% of optical length L1 from the laser diode 1 to the condenser lens 5. Further, as shown in FIG. 32, the light beam transmitting the outer portion 308b of the object lens 308 has large spherical aberration and diverges in a relatively wide range in the information plane in an optical disk 18, and the reflected light also is diverged with large spherical aberration. Therefore, the reflected light of the light transmitting the outer portion 308b does not enter the photodetector 22 generally. Then, without providing a means for limiting numerical aperture, CD reproduction becomes possible at numerical number 0.45. If the optical length L2 is set to a value equal to or smaller than 80% of L1, the degree of diffusion is decreased, and it is not desirable for reproduction performance of CD.

Figure 33:
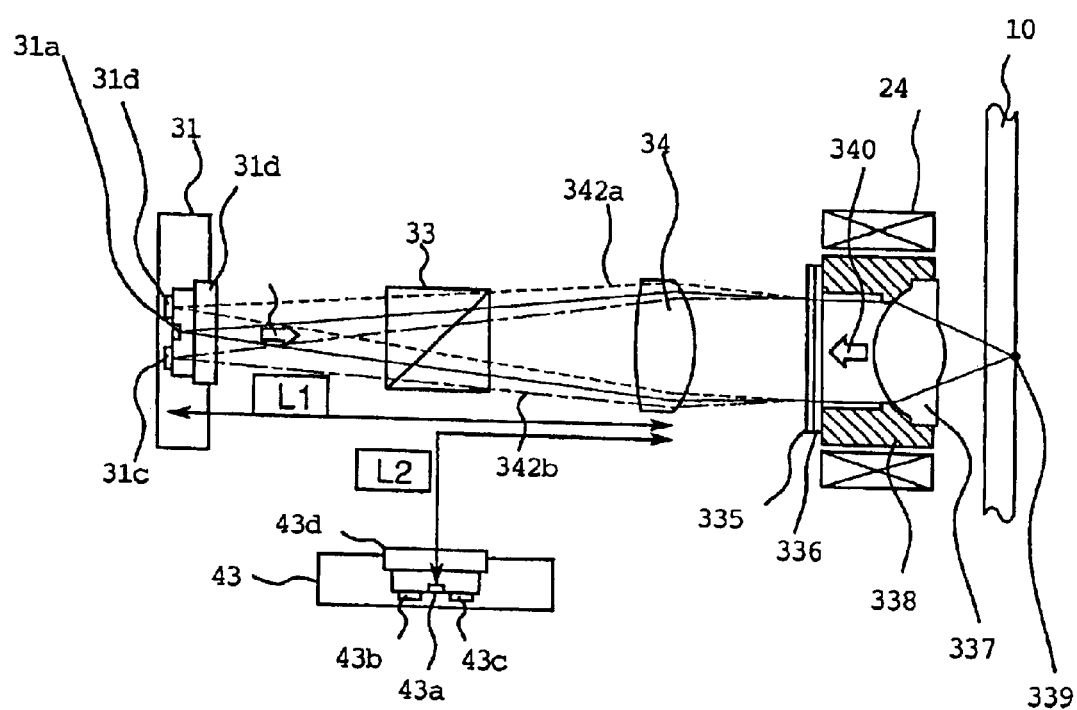
FIG. 33 is a diagram of an optical system of optical head according an eighth embodiment of the invention.
Figure 34:
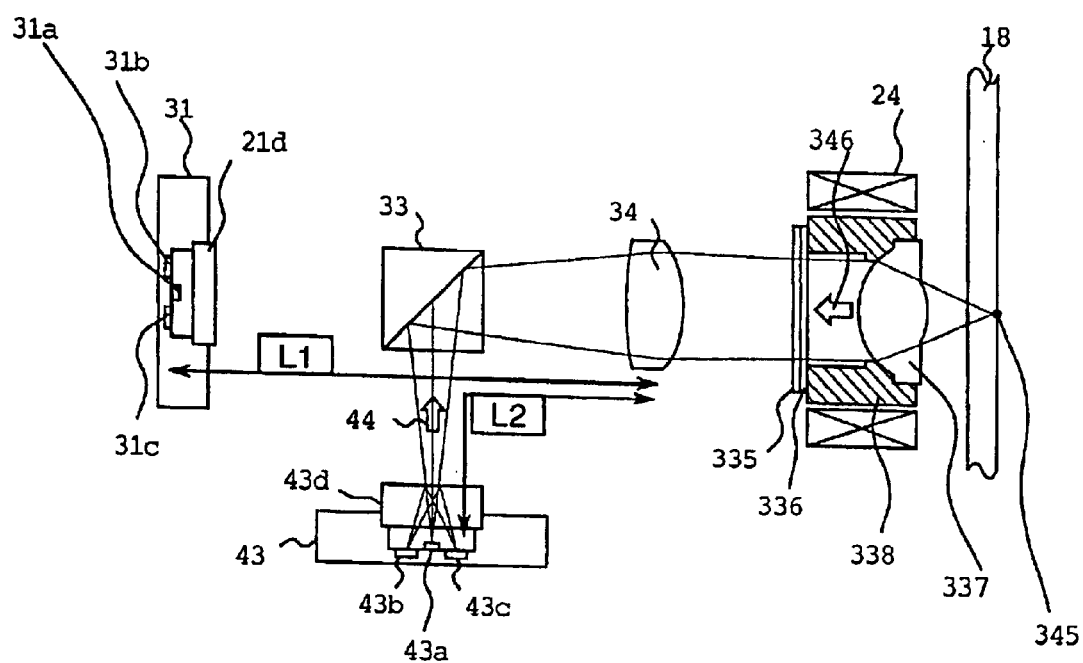
FIG. 34 is another diagram of the optical system of optical head according the eighth embodiment of the invention.

Next, an eighth embodiment of the invention is explained with reference to relevant drawings. FIGS. 33 and 34 show an optical system in the optical system of optical head according to the invention. FIG. 33 shows a situation for recording and reproduction to and from an optical disk 10 of plate thickness 0.6 mm, while FIG. 34 shows a situation for recording and reproduction to and from an optical disk 18 of plate thickness 1.2 mm.

Figure 35:
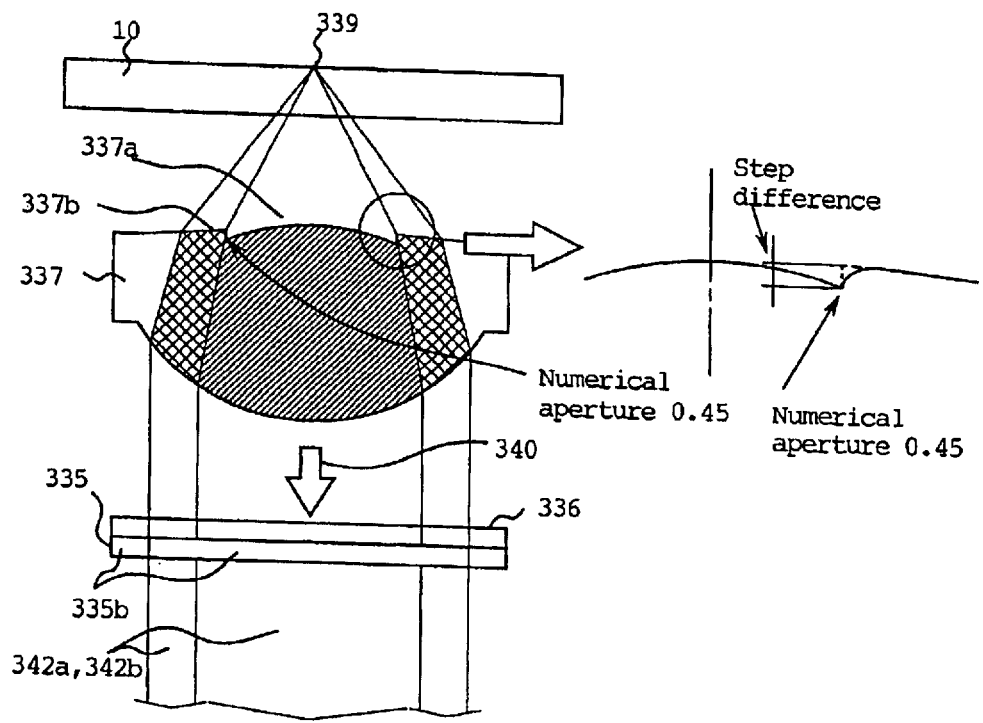
FIG. 35 is a diagram of an object lens in the optical system of optical head according the eighth embodiment of the invention.
Figure 36:
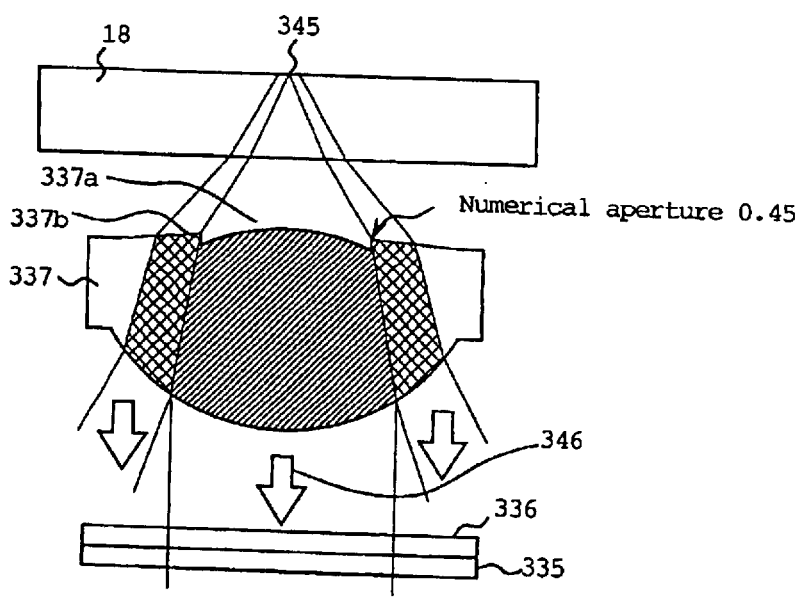
FIG. 36 is another diagram of the object lens in the optical system of optical head according the eighth embodiment of the invention.

In FIG. 33, a first module 31 for DVD comprises a laser diode 31a of wavelength 650 nm integrated as one body with photodetectors 31b and 31c for receiving light reflected from the optical disk 10. In the first module 31, a light beam 32 of wavelength 650 nm emitted by the laser diode 31a transmits a cover glass 31d to enter a wavelength filter 33. The wavelength filter 33 transmits light of 650 nm and reflects light of wavelength 780 nm. Then, the light beam 32 transmits the wavelength filter 33 and is collimated by a condenser lens 34 to become a generally collimated light beam. The collimated light beam 32 transmits a polarizing hologram 335 and a wavelength filter 33 to enter an object lens of numerical aperture 0.6. The polarizing hologram 335 and the wavelength plate 336 are integrated as one body, and they are fixed to a holder 38 with the object lens 337. As shown in FIG. 10, the polarizing hologram 335 is fabricated by forming a hologram in a LiNb plate made of a birefringence material with proton exchange. It transmits extraordinary light and diffracts ordinary light. The light beam 32 is handled as extraordinary light by the polarizing hologram 335 and it transmits the polarizing hologram 335 without diffraction. The wavelength plate 336 converts light of wavelength 650 nm from linear polarization to generally circular polarization and does not change polarization for light of wavelength 780 nm. Thus, the light beam 32 is converted to circular polarization. The object lens 337 is designed similarly to the counterpart 308 in the seventh embodiment. As shown in FIGS. 35 and 36, the central portion 337a with numerical aperture in a range of plate thickness 0.9 mm is designed to have minimum aberration for disk plate thickness 0.9 mm. The light beam 32 is converged by the object lens 337 to form a light spot 339 on an information plane in the optical disk 10 of plate thickness 0.6 mm.

Next, the light 340 reflected by the optical disk 10 is condensed by the object lens 337, is converted by the wavelength plate 336 from the circular polarization to linear polarization having a polarization direction perpendicular to a polarization plane of the light beam 32 and enters the polarizing hologram 335. Because the reflected light 340 enters the polarizing hologram 335 as ordinary light, it is diffracted. The diffraction divides the reflected light 340 into diffracted light 342a for detecting focus signal and diffracted light 342b for detecting tracking signal. The diffracted lights 342a and 342b are narrowed by the condenser lens 334 to be received by the photodetectors 31b and 31c, respectively, and reproduction signals are detected by one or both of the photodetectors. Further, the photodetector 31b detects a focus control signal for making the object lens 337 follow the information plane with spot size detection technique and the photodetector 31c detects a tracking control signal for tracking an information track with phase difference technique or push-pull technique.

On the other hand, a second module 43 for CD comprises a laser diode 43a of wavelength 780 nm, a hologram 43d for separating reflected light from an optical disk to give spacial change and photodetectors 43a, 43b for detecting the reflected light, and they are integrated as one body. In FIG. 34, a part of a light beam 44 of wavelength 780 nm emitted by the laser diode 43a transmits the hologram 43d and enters the wavelength filter 33. Because the wavelength filter 33 is designed to reflect light of wavelength 780 nm, the light beam 44 is reflected by the wavelength filter 33 and is collimated by the condenser lens 34. The collimated light beam 44 transmits the polarizing hologram 335 and the wavelength plate 336 to enter the object lens of numerical aperture 0.6. The light beam 44 is handled as extraordinary light by the polarizing hologram 335, and it transmits the polarizing hologram 335 without diffraction. The reflected light 346 transmitting the polarizing hologram 335 is narrowed by the condenser lens 34 and is reflected by the wavelength filter 33 to enter the second module 43. The reflected light 46 entering the second module 43 is diffracted by the hologram 43d to enter the photodetectors 43b and 43c, and reproduction signals are detected by one or both of the photodetectors. Further, the photodetector 43b detects a focus control signal for making the object lens 337 follow the information plane with spot size detection technique, and the photodetector 43c detects a tracking control signal for tracking an information track with phase difference technique or push-pull technique.

In the above-mentioned structure using two wavelengths 650 and 780 nm, when a CD is reproduced with light of wavelength 780 nm, the numerical aperture of the central portion 337a of the object lens 337 has to be decreased to about 0.45. However, if the numerical aperture of optimum design plate thickness 0.9 mm becomes 0.45, the light spot for recording and reproduction of DVD generates aberration larger than 80 mλ rms. Usually a light spot having aberration larger than 80 mλ rms has large so-called side lobes, so that recording and reproduction performance is deteriorated. Therefore, if the light source of 780 nm is added and only the numerical aperture of the central portion 308a is increased in the prior art structure, the performance is not satisfactory. In this embodiment, the numerical aperture of the central portion 308a is increased, and similarly to the seventh embodiment, as shown in FIG. 35, a step is provided at a boundary between the outer portion and the inner portion of the object lens 337 to decrease fifth spherical aberration component in the aberration components. Thus, the side lobes of the light spot 339 are reduced to improve the recording and reproduction performance. In order to suppress the fifth aberration to 20 mλ (rms) or less, it is found that it is desirable that the phase shift has a value in a range between 50 and 150 degrees. It is also found that the total aberration is not changed much when the phase step is changed. In this embodiment, the step is formed with a smooth curve in order to improve formability of the object lens. By using such a lens having a smooth shape, an object lens made of glass can be formed while stable performance is ensured against change in ambient temperature. The amplitude of the step is set to a value to be converted to 100 degrees of phase difference.

Figure 37:
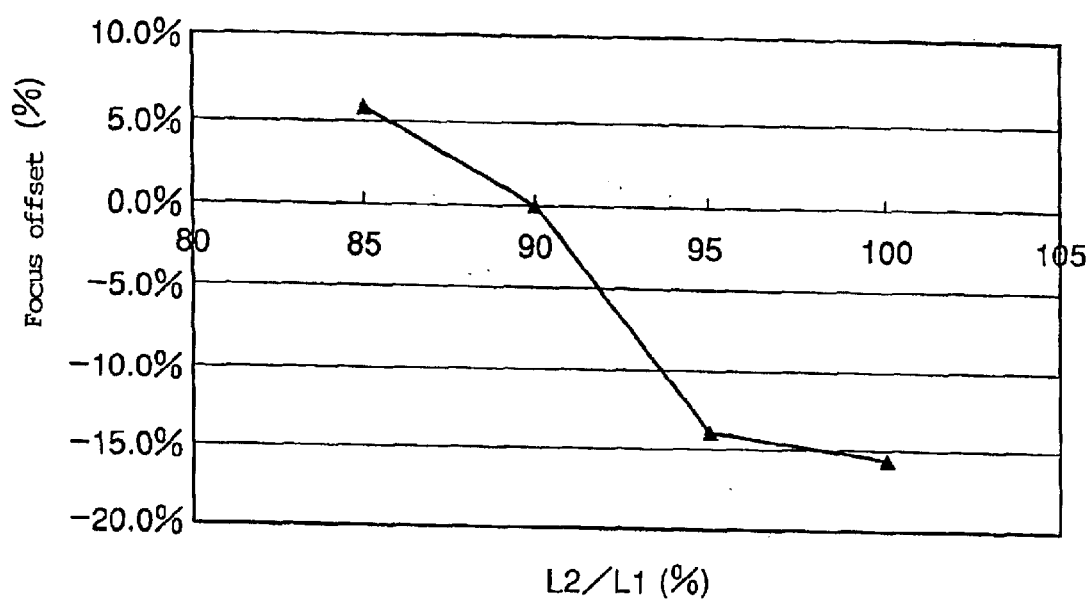
FIG. 37 is a graph on a relationship between focus offset and L2/L1.

On the other hand, when the optical disk 18 of plate thickness 1.2 mm such as CD is used for recording or reproduction, the range of numerical aperture of 0.45 of the object lens 337 is set for the optimum design plate thickness 0.9 mm, so that the aberration of the light transmitting it is suppressed to a similar order to the prior art structure. However, it is preferable for suppression of aberration that optical length L2 from the laser diode 43a to the condenser lens 34 is set to a value between 80 and 95% of optical length L1 from the laser diode 31a to the condenser lens 34. FIG. 37 shows change in focus offset plotted against L2. In this case, it is found that the focus offset can be set to zero by setting L2 to 90% of L1. Further, the light beam transmitting the outer portion 337b of the object lens 337 has large spherical aberration and diverges in a relatively wide range in the information plane in an optical disk 18, and the reflected light also is diverged with large spherical aberration. Therefore, the reflected light of the light transmitting the outer portion 337b does not enter the photodetectors 43b, 43c generally. Then, without providing a means for limiting numerical aperture, CD reproduction becomes possible at numerical number 0.45. If the optical length L2 is set to a value equal to or smaller than 80% of optical length L1, the degree of diffusion is decreased, and it is not desirable for reproduction performance of CD.

In the seventh and eighth embodiments, a similar advantage is realized by using a lens fabricated by integrating a condenser lens and an object lens as one body.

It is apparent from the above-mentioned explanation that according to the seventh and eighth embodiments a lens can be provided which can reproduce a CD as well as a DVD by increasing NA for CD reproduction and by using a laser of 780 nm. Thus, compatibility of DVD and CD is realized with a simple optical head using one lens. Further, an optical head can be fabricated compactly, and an optical disk drive can also be manufactured compactly.

Further, by shortening the optical length from the laser for CD to the condenser lens than that from the laser for DVD to the condenser lens, aberration is suppressed to improve the quality of reproduction signals, and focus offset is decreased.

In the above-mentioned first to eighth embodiments, the range of optimum design plate thickness 0.9 mm is set to NA 0.45 as an example for compatibility between DVD and CD. However, it is possible to set the optimum design plate thickness to a value equal to or larger than 1.0 mm. Further, it is also possible to extend the range further to about 0.50 for the compatibility between DVD and laser disk (LD).

Figure 38:
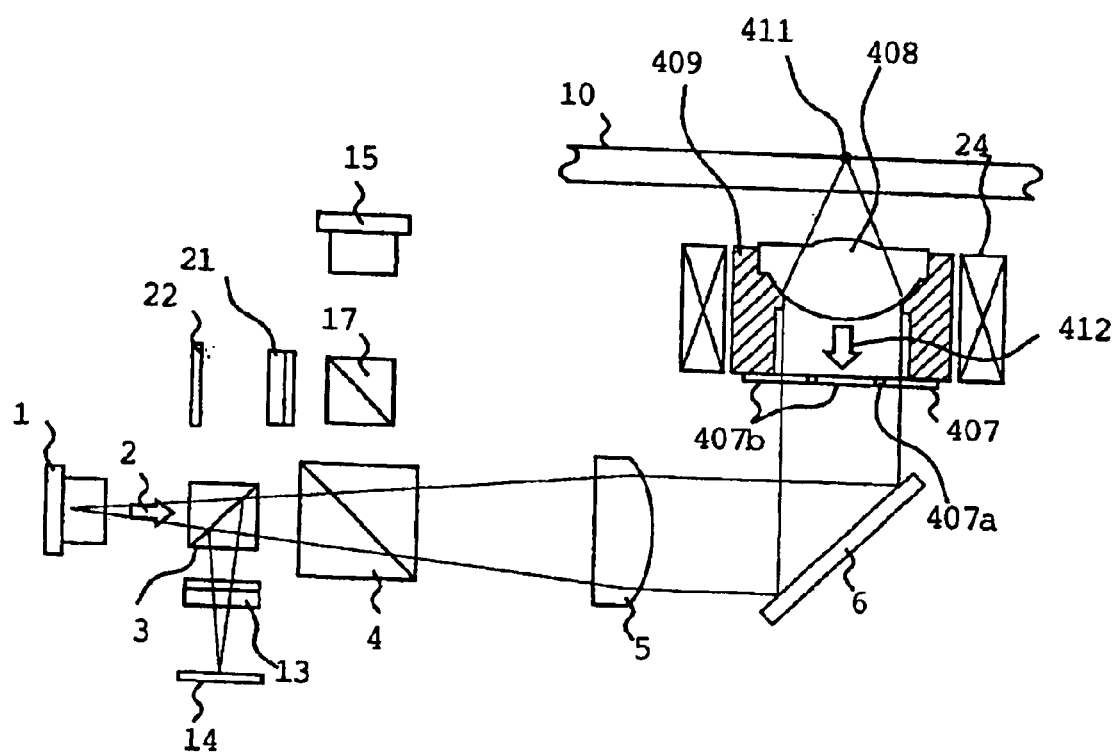
FIG. 38 is a diagram for illustrating recording and reproduction for an optical disk having small thickness such as a DVD by using an optical system of optical head according to a ninth embodiment of the invention.
Figure 39:
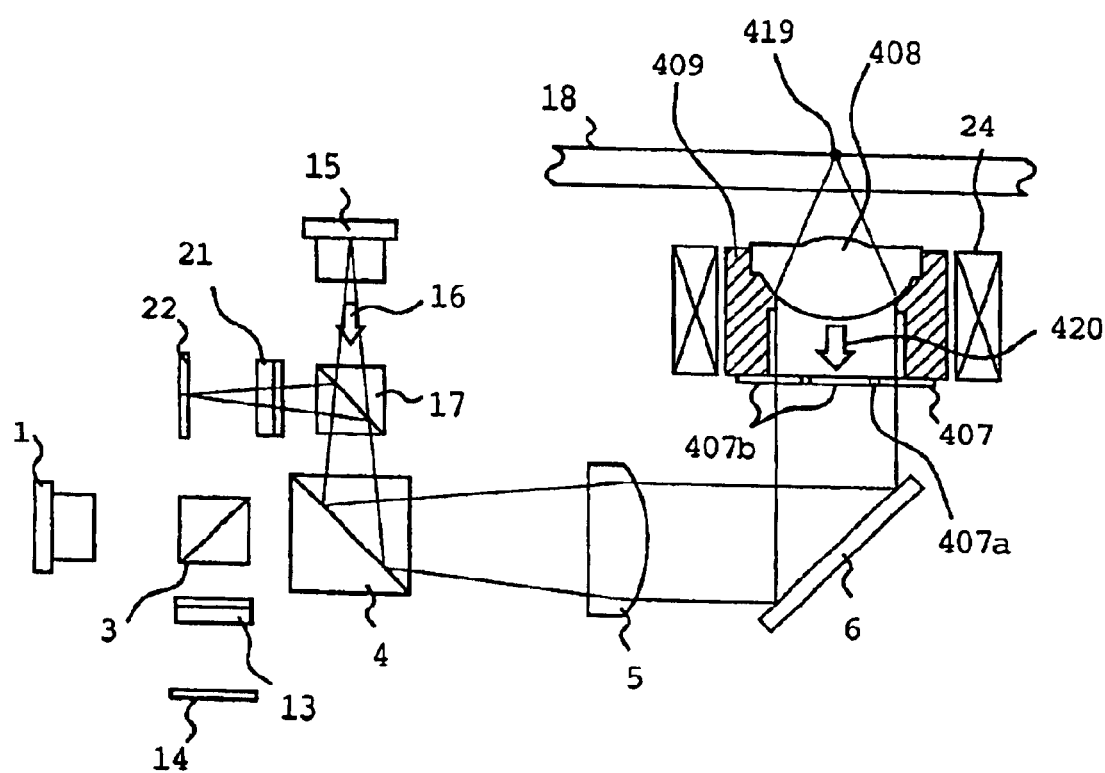
FIG. 39 is a diagram for illustrating recording and reproduction for an optical disk having large thickness such as a CD, similarly to FIG. 38.
Figure 40:
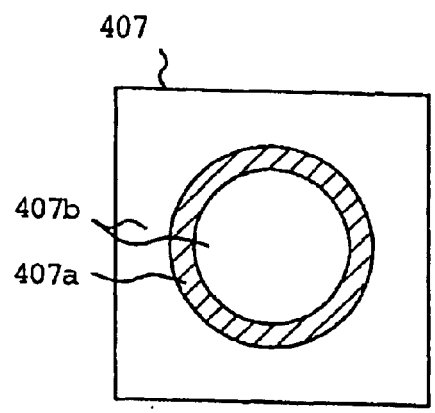
FIG. 40 is a front view of a light-shielding filter arranged in the optical system.
Figure 41:
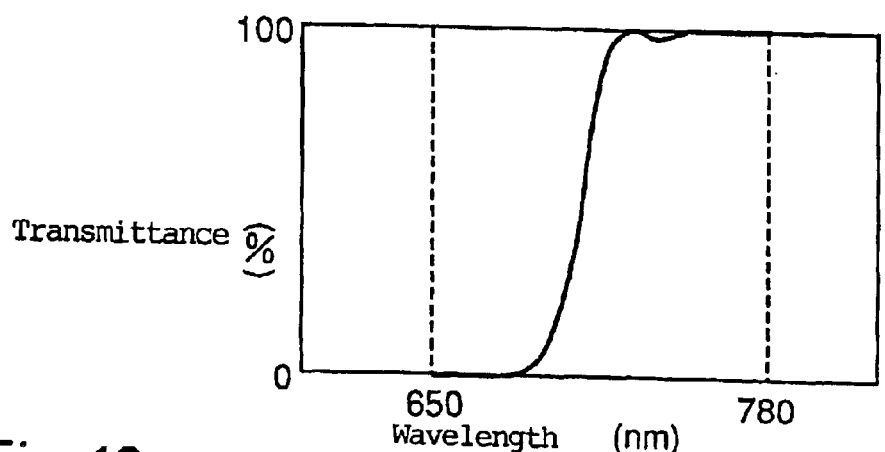
FIG. 41 is a graph of transmittance characteristic of a light-shielding portion in the filter shown in FIG. 40.
Figure 42:
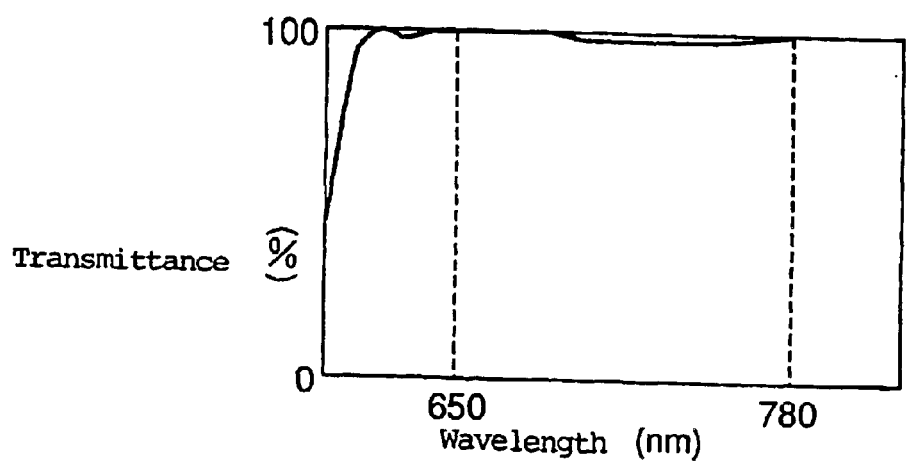
FIG. 42 is another graph of transmittance characteristic of a light-shielding portion in the filter shown in FIG. 40.
Figure 43:
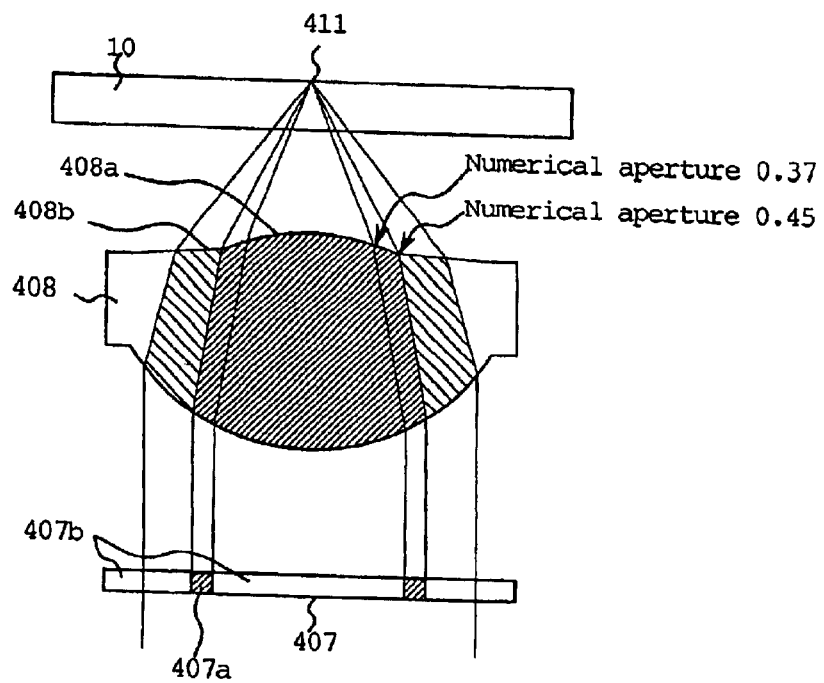
FIG. 43 is a diagram for illustrating formation of light spot by using an object lens and the light-shielding filter for an optical disk having small plate thickness.

Next, a ninth embodiment of the invention is explained with reference to relevant drawings. FIG. 38 shows a situation for recording and reproduction to and from an optical disk 10 of plate thickness 0.6 mm, while FIG. 39 shows a situation for recording and reproduction to and from an optical disk 18 of plate thickness 1.2 mm. In FIG. 38, a light beam 2 of wavelength 650 nm is emitted by a laser diode 1, and about half thereof transmits a beam splitter 3 to enter a wavelength filter 4. The wavelength filter 4 is designed to transmit light of wavelength 650 nm and to reflect light of wavelength 780 nm. Then, the light beam 2 transmits the wavelength filter 4 and is collimated by a condenser lens 5 to become a generally collimated light beam. The collimated light beam 2 is reflected by a mirror 6, transmits a light-shielding filter 407 and enters an object lens 408 of numerical aperture 0.6. The light-shielding filter 407 and the object lens 408 are fixed to a holder 409. As shown in FIG. 40, the light-shielding filter 407 comprises a ring-like light-shielding portion 407a and a transmitting portion 407b. As shown in FIG. 41, the light-shielding portion 407a shields light of wavelength 650 nm and transmits light of wavelength 780 nm, while as shown in FIG. 42, the transmitting portion 407b has wavelength characteristic that light is transmitted for both wavelengths of 650 and 780 nm. Further, as shown in FIG. 43, the light-shielding portion 407a shields a part of the light beam in correspondence to numerical aperture from 0.37 to 0.45.

The object lens 408 is designed so that a central portion 408a of numerical aperture equal to or smaller than 0.45 has minimum aberration for a disk plate thickness 0.9 mm while an outer portion 408b of numerical aperture equal to or larger than 0.45 has minimum aberration for a disk plate thickness 0.6 mm. The light beam 2 shielded by the light-shielding filter 7 as a ring form is converged by the object lens 408 to form a light spot 411 on an information plane in the optical disk 10 of plate thickness 0.6 mm.

The light 412 reflected by the optical disk 10 is condensed by the object lens 408, passes the light-shielding filter 407 and the mirror 6 and is narrowed by the condenser lens 5. Then, the narrowed light beam 412 transmits the wavelength filter 4 to enter the beam splitter 3. About half of the light incident on the beam splitter 3 is reflected. Then, it transmits a cylindrical lens 13 and is received by a photodetector 14. The photodetector 14 detects not only reproduction signals, but also a focus control signal for making the object lens 8 follow the information plane with astigmatism technique and a tracking control signal for tracking an information track with phase difference technique or push-pull technique.

On the other hand, in FIG. 39, a light beam 16 of wavelength 780 nm is emitted by a laser diode 15, and about half thereof transmits a beam splitter 17 to enter the wavelength filter 4. Because the wavelength filter 4 is designed to reflect light of wavelength 780 nm, the light beam 16 is reflected by the wavelength filter 4 and is collimated by the condenser lens 5. The collimated light beam 16 passes the mirror 6 and the light-shielding filter 407 to enter the object lens 408 of numerical aperture 1.2. As shown in the wavelength characteristics in FIGS. 41 and 42, the light beam 16 of wavelength 780 nm transmits both of the light-shielding portion 407a and the transmitting portion 407b and is converged by the object lens 408 to form a light spot 419 on an information plane in the optical disk 18 of plate thickness 1.2 mm.

The light 420 reflected by the optical disk 18 is collected by the object lens 408, passes the mirror 6 and the light-shielding filter 407 and is narrowed by the condenser lens 5. Then, it is reflected by the wavelength filter 4 to enter the beam splitter 17. About half of the light incident on the beam splitter 17 is reflected. Then, it transmits a cylindrical lens 21 and is received by a photodetector 22. The photodetector 22 detects not only reproduction signals, but also the focus control signal with astigmatism technique and the tracking control signal with phase difference technique or push-pull technique.

In the above-mentioned structure using two wavelengths 650 and 780 nm, when a CD is reproduced with light of wavelength 780 nm, the numerical aperture of the central portion 408a of the object lens 408 has to be decreased to about 0.45. However, if the numerical aperture of optimum design plate thickness 0.9 mm becomes 0.45, the light spot 411 for recording and reproduction of DVD generates aberration larger than 80 mλ rms. Then, recording and reproduction performance is deteriorated, and if the light source of 780 nm is added and only the numerical aperture of the central portion 408a is increased in the prior art structure, the performance is not satisfactory. In this embodiment, the numerical aperture of the central portion 408a is increased, and as shown in FIG. 43, the light-shielding portion 407a of the light-shielding filter 407 shields a part of the light beam 2 in correspondence to numerical aperture from 0.37 to 0.45. Thus, aberration is decreased. That is, the light spot 411 used for recording or reproduction of DVD is formed by synthesizing a light beam transmitting the central portion 408a of the object lens 408 of numerical aperture equal to or smaller than 0.37 and another light beam transmitting the outer portion 408b of numerical aperture from 0.45 to 0.6. Aberration is small in a region near the center of optical axis of the object lens 408 even when the design plate thickness is deviated, and for numerical aperture of about 0.37 the aberration is about 30 mλ rms when the light transmitting the central portion of plate thickness 0.9 mm is focused on an optical disk of plate thickness of 0.6 mm. Then, the recording and reproducing performance is not deteriorated. Therefore, recording and reproduction can be possible for a DVD by using the above-mentioned light spot 411 synthesized from light beams transmitting the outer portion 408b and the central portion 408a of numerical aperture equal to or smaller than 0.37.

Figure 44:
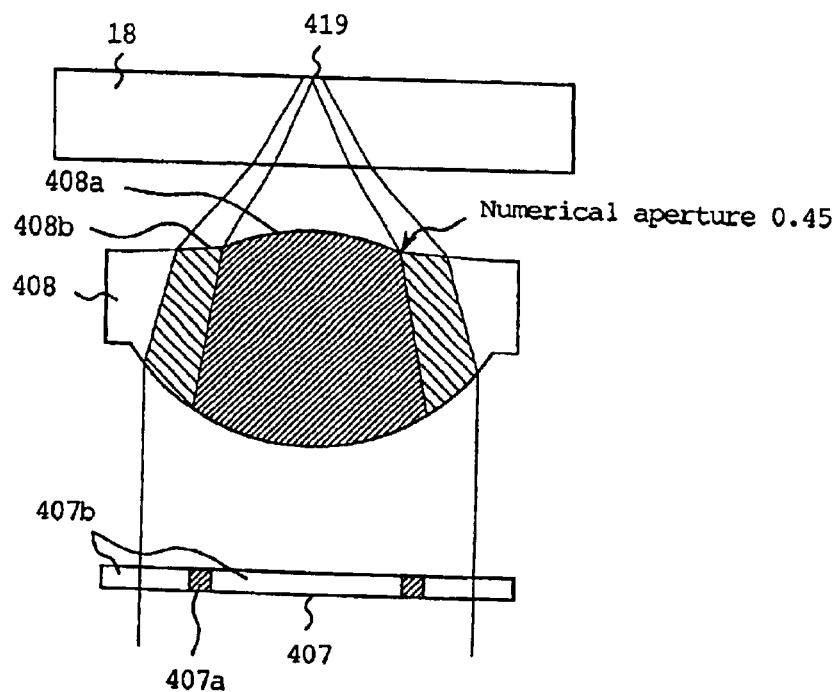
FIG. 44 is a diagram for illustrating formation of light spot by using an object lens and the light-shielding filter for an optical disk having large plate thickness.

When an optical disk of thickness 1.2 mm such as CD is subjected to recording or reproduction, the range of numerical number 0.45 of the object lens 408 is designed for optimum design plate thickness 0.9 mm, so that aberration of the light transmitting the object lens can be suppressed to a value about the same as that in a prior art device. As shown in FIG. 44, the light beam transmitting the outer portion 408b of the object lens 408 has large spherical aberration and it is diverged in a relatively wide range on an information plane in an optical disk 18, and the reflected light thereof is also diverged. Therefore, the reflected light transmitting the outer portion 408b does not enter the photodetector 22 generally. Because the light-shielding filter 407 does not shield the light beam 16, the numerical aperture of the object lens becomes 0.45 for recording or reproduction of CD, and the numerical number of the same order as in a conventional CD drive can be obtained.

In this embodiment, the light-shielding filter 407 is a filter using an optical thin film. Further, a similar advantage can be obtained by providing a hologram having a function of wavelength selection for diffracting the light of wavelength 650 nm only for the light-shielding region 407a. In the above-mentioned example, a region of numerical aperture 0.45 of the object lens 408 is provided for optimum design plate thickness 0.9 mm. This region is a practical region because aberration on CD reproduction is suppressed to 40 $m\lambda$ rms for 70% or more of the plate thickness of optical disk 18. In the above-mentioned example, the light-shielding portion 407a corresponds to numerical aperture from 0.45 to 0.37 of the object lens 408. The performance for DVD can be secured for 70% or more of the numerical aperture 0.45 for CD.

Figure 45:
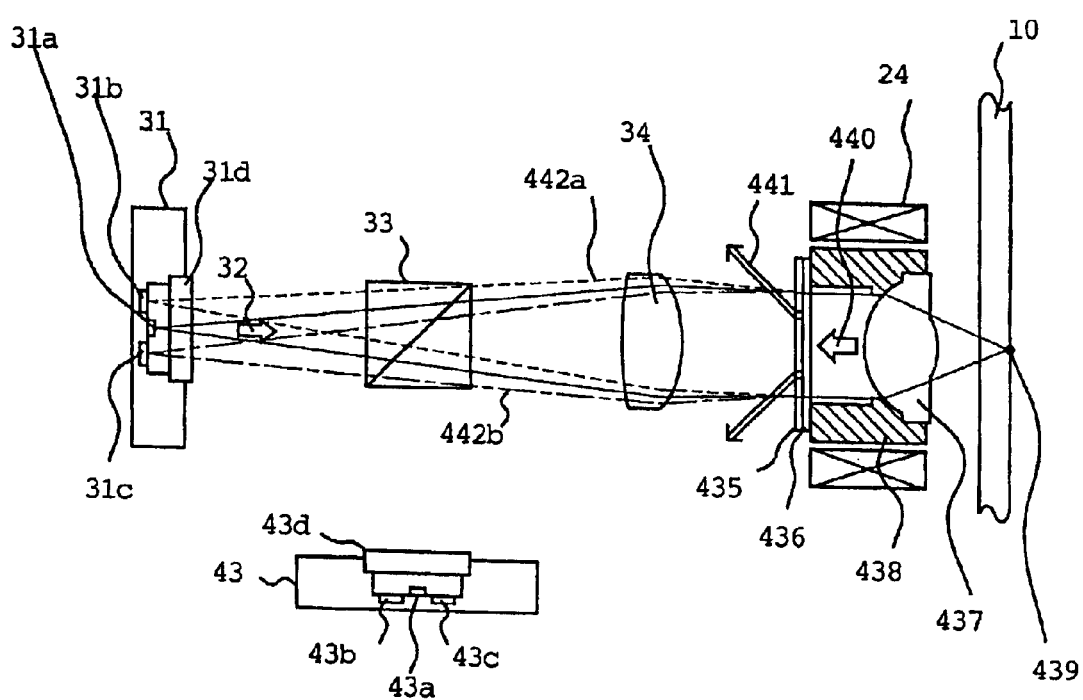
FIG. 45 is a diagram for illustrating recording and reproduction for an optical disk having small thickness such as a DVD by using an optical system of optical head according to a tenth embodiment of the invention.
Figure 46:
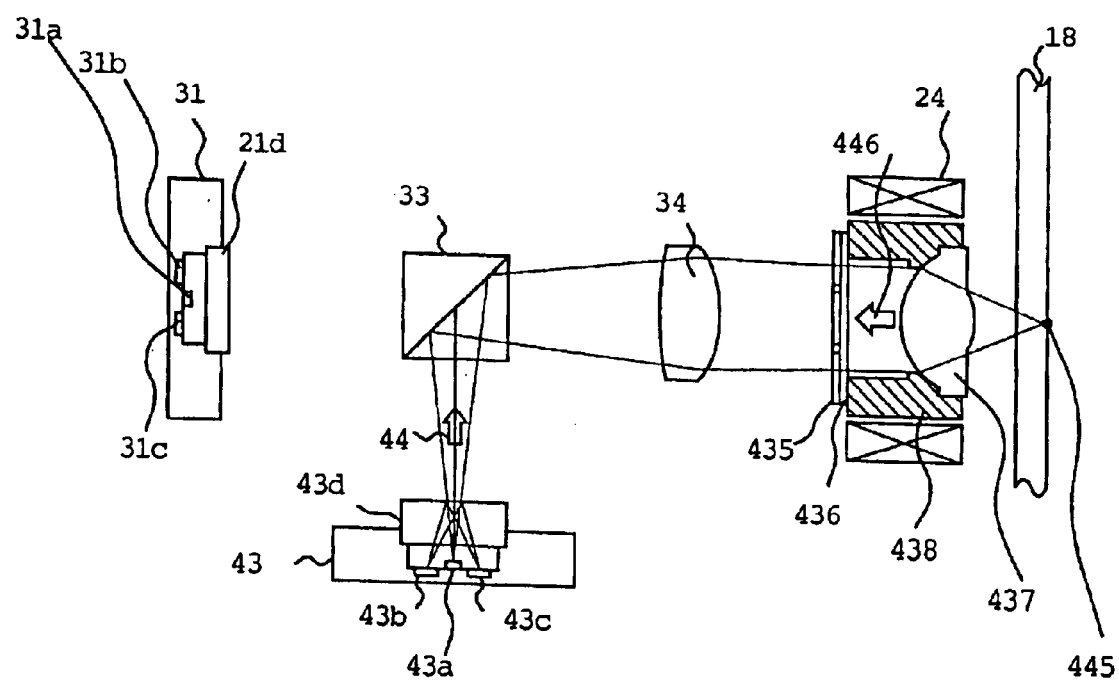
FIG. 46 is a diagram for illustrating recording and reproduction for an optical disk having large thickness such as a CD, similarly to FIG. 45.
Figure 47:
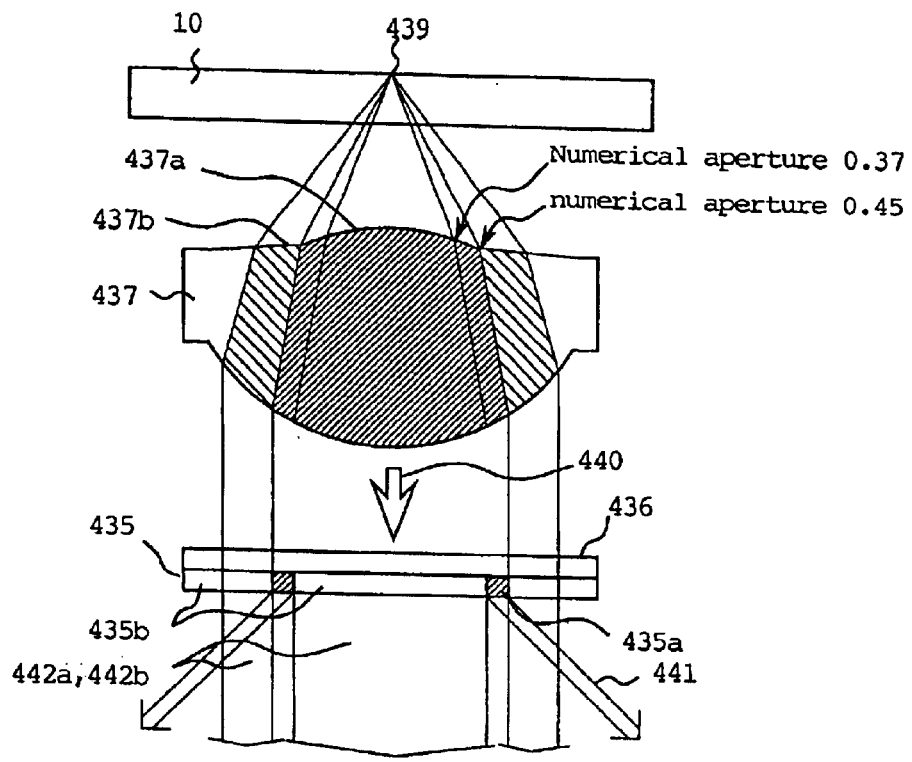
FIG. 47 is a diagram for illustrating formation of light spot by using an object lens and the polarizing hologram for an optical disk having small plate thickness.

Next, a tenth embodiment of the invention is explained with reference to relevant drawings. FIG. 45 shows a situation for recording and reproduction to and from an optical disk 10 of plate thickness 0.6 mm, while FIG. 46 shows a situation for recording and reproduction to and from an optical disk 18 of plate thickness 1.2 mm. In FIG. 45, a first module 31 for DVD comprises a laser diode 31a of wavelength 650 nm which is integrated as one body with photodetectors 31b and 31c for receiving light reflected from the optical disk 10. In the first module 31a, light beam 32 of wavelength 650 nm emitted by the laser diode 31a transmits a cover glass 31d to enter a wavelength filter 33. The wavelength filter 33 transmits light of 650 nm and reflects light of wavelength 780 nm. Then, the light beam 32 transmits the wavelength filter 33 and is collimated by a condenser lens 34 to become a generally collimated light beam. The collimated light beam 32 transmits a polarizing hologram 35 and a wavelength plate 436 to enter an object lens 437 of numerical aperture 0.6. The polarizing hologram 35 and the wavelength plate 436 are integrated as one body, and they are fixed to a holder 438 with the object lens 437. As shown in FIG. 10, the polarizing hologram 435 is fabricated by forming a hologram in a LiNb plate made of a birefringence material with proton exchange. It transmits extraordinary light and diffracts ordinary light. The light beam 32 is handled as extraordinary light by the polarizing hologram 35, and it transmits the polarizing hologram 35 without diffraction. The wavelength plate 436 converts light of wavelength 650 nm from linear polarization to generally circular polarization, but it does not change polarization for light of wavelength 780 nm. Thus, the light beam 32 is converted to circular polarization. The object lens 437 is designed similarly to the counterpart 408 in the ninth embodiment. As shown in FIG. 47, a central portion 437a of numerical aperture equal to or smaller than 0.45 has minimum aberration for a disk plate thickness 0.9 mm while an outer portion 437b of numerical aperture equal to or larger than 0.45 has minimum aberration for a disk plate thickness 0.6 mm. The light beam 32 is converged by the object lens 437 to form a light spot 439 on an information plane in the optical disk 10 of plate thickness 0.6 mm.

Next, the light 440 reflected by the optical disk 10 is condensed by the object lens 437, is converted by the wavelength plate 436 from the circular polarization to linear polarization having a polarization direction perpendicular to a polarization plane of the light beam 32 and enters the polarizing hologram 435. Because the reflected light 440 enters the polarizing hologram 435 as ordinary light, it is diffracted. The diffraction divides the reflected light 440 into diffracted light 442a for detecting focus signal, diffracted light 442b for detecting tracking signal and diffracted light 441 for light shielding. As shown in FIG. 45, the ring-like hologram diffracts the light 441 on a portion in correspondence to numerical aperture of 0.37 to 0.45 of the object lens 437, so that the resultant light does not enter the photodetectors 31b and 31c. The diffracted lights 442a and 442b are narrowed by the condenser lens 434 to be received by the photodetectors 31b and 31c, respectively, and reproduction signals are detected by one or both of the photodetectors. Further, the photodetector 31b detects a focus control signal for making the object lens 37 follow the information plane with spot size detection technique and the photodetector 31c detects a tracking control signal for tracking an information track with phase difference technique or push-pull technique.

On the other hand, as shown in FIG. 46, a second module 43 for CD comprises a laser diode 43a of wavelength 780 nm, a hologram 43d for separating light reflected from an optical disk to give spacial change and photodetectors 43a, 43b for detecting the reflected light, and they are integrated as one body. In FIG. 46, a part of a light beam 44 of wavelength 780 nm emitted by the laser diode 43a in the second module 43 transmits the hologram 43d and enters the wavelength filter 33. Because the wavelength filter 33 reflects light of wavelength 780 nm, the light beam 44 is reflected by the wavelength filter 33 and is collimated by the condenser lens 34. The collimated light beam 44 transmits the polarizing hologram 435 and the wavelength plate 436 to enter the object lens 437 of numerical aperture 0.6. The light beam 44 is handled as extraordinary light by the polarizing hologram 435 and it transmits the polarizing hologram 435 without diffraction. Because the wavelength plate 436 does not convert polarization direction of light of wavelength 780 nm, the polarization plane of the light beam 44 is maintained. Thus, the light beam 44 is focused by the object lens 437 to form a light spot 445 on an information plane in the optical disk 18 of plate thickness 1.2 mm.

The light 46 reflected by the optical disk 18 is condensed by the object lens 437 and transmits the wavelength plate 436 and the polarizing hologram 435. Because the wavelength plate 436 does not change polarization direction for light of wavelength 780 mm, the reflected light 446 transmits the wavelength plate 436 as linear polarization, similarly to the light beam 44. Because the reflected light 46 enters the polarizing hologram 435 as extraordinary light, it is not diffracted. The light 46 transmitting the polarizing hologram 35 is narrowed by the condenser lens 34 and is reflected by the wavelength filter 33 to enter the second module 43. The reflected light 46 entering the second module 43 is diffracted by the hologram 43d to enter the photodetectors 43b and 43c, and reproduction signals are detected by one or both of the photodetectors. Further, the photodetector 43b detects a focus control signal for making the object lens 437 follow the information plane with spot size detection technique and the photodetector 43c detects a tracking control signal for tracking an information track with phase difference technique or push-pull technique.

In the above-mentioned structure, when an optical disk of thickness 1.2 mm such as CD is subjected to recording or reproduction, as shown in FIG. 47, the diffraction portion 435a of the polarizing hologram 435 diffracts the reflected light on a part in correspondence to numerical aperture from 0.37 to 0.45 of the object lens 437 to generate diffracted light 441. Thus incidence thereof onto the photodetector is prevented. Then, the light 442a, 442b reflected by the diffraction portion 435a does not include components having large aberration. That is, only the above-mentioned synthesized light is detected when a DVD is recorded or reproduced. Aberration of the region near the central axis of light beam of the object lens is small even when the design plate thickness is deviated, and for numerical aperture of about 0.37 the aberration is about 30 mλ rms when the light transmitting the central portion 437a of the optimum design plate thickness 0.9 mm is focused on an optical disk of plate thickness of 0.6 mm. Then, the recording and reproducing performance is not deteriorated. Therefore, recording and reproduction can be possible for a DVD by using the above-mentioned light spot 411 synthesized from light beams transmitting the outer portion 437b and the central portion 437a of numerical aperture equal to or smaller than 0.37.

Figure 48:
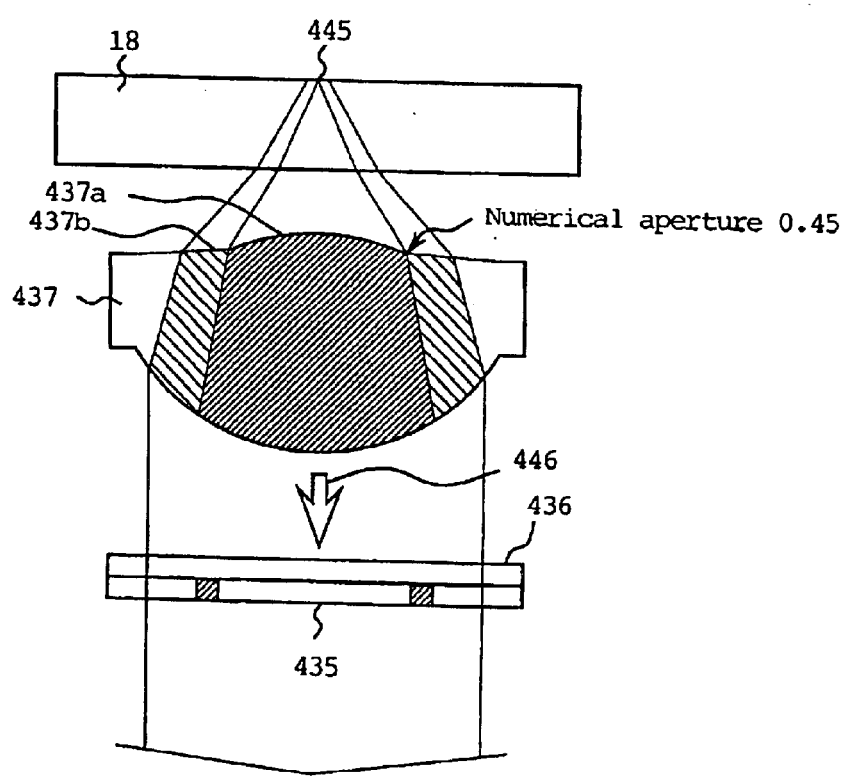
FIG. 48 is a diagram for illustrating formation of light spot by using an object lens and the polarizing hologram for an optical disk having large plate thickness.

When an optical disk 18 of thickness 1.2 mm such as CD is subjected to recording or reproduction, the range of numerical number 0.45 of the object lens 437 is designed for optimum design plate thickness 0.9 mm, so that aberration of the light transmitting the object lens can be suppressed to a value about the same as that in a prior art device. As shown in FIG. 48, the light beam transmitting the outer portion 437b of the object lens 437 has large spherical aberration and it is diverged in a relatively wide range on an information plane in an optical disk 18, and the reflected light thereof is also diverged. Therefore, the reflected light transmitting the outer portion 437b does not enter the photodetector 22 generally. Because the polarizing hologram 435 does not diffract both of the light beam 44 and the diffracted light 446, the numerical aperture of the object lens becomes 0.45 for recording or reproduction of CD, and the numerical number of the same order as in a conventional CD drive can be obtained.

In this embodiment, a region of numerical aperture 0.45 of the object lens 437 provided for optimum design plate thickness 0.9 mm is explained. This region is a practical region because aberration on CD reproduction is suppressed to 40 mλ rms for 70% or more of the plate thickness of optical disk 18. In the above-mentioned example, the diffraction portion 435a corresponds to numerical aperture from 0.45 to 0.37 of the object lens 437. The performance for DVD can be secured for 70% or more of the numerical aperture 0.45 for CD.

It is apparent from the above-mentioned explanation that according to the ninth and tenth embodiments, light of first wavelength is shielded or diffracted by the ring region having numerical aperture from NA3 to NA1 (0.7*NA1≦NA3<NA1), so that the numerical aperture of the central portion of the object lens is set to NA3 practically for the light of first wavelength, an information medium of disk plate thickness t1 can be recorded or reproduced with small aberration.

Further, when an information medium of disk plate thickness t2 (t2>t3) is recorded or reproduced, the numerical number of the central portion of the object lens can be set to NA1 (>NA3). Because the numerical aperture is set optimally for plate thickness t3, and the aberration can be made relatively small. As a result, an optical head using only one object lens can be provided wherein an information medium of disk plate thickness t1 such as DVD can be recorded or reproduced with light of, for example, wavelength 650 nm while an information medium of disk plate thickness t2 such as CD can be recorded or reproduced with light of, for example, wavelength 780 nm.

Further, by using only one optical head, a DVD, a CD and a CD-R having wavelength dependence can be recorded or reproduced, and compatibility between DVD and all CDs can be secured.

Although the present invention has been described in connection with the preferred embodiments thereof, it is to be noted that various changes and modifications are to be understood illustrative and not limiting.

What is claimed is:

1. A converging element which converges a first light beam from a first light source onto a first optical information recording medium having a transparent plate, and converges a second light beam from a second light source onto a second optical information medium having a second transparent plate thicker than the first optical information recording medium, said converging element having an inner region near a center axis of the first and second light beams and an outer region far from the center axis, said outer region having a plane optimized to converge the first light beam transmitting said outer region onto the first optical information recording medium, said inner region having a plane optimized to converge the second light beam transmitting said inner region onto the second information recording medium having a larger thickness than the first information recording medium, wherein a phase of the light beam transmitting an innermost portion in the plane of said outer region is shifted relative to that of the light beam transmitting an outermost portion in the plane of said inner region, said converging element comprising:

a lens which converges the first light beam onto the first optical information recording medium and the second light beam onto the second optical information recording medium; and an optical plate element to be cooperated with said lens;

wherein said lens comprises a first inner subregion near a center axis of the first and second light beams and a first outer subregion far from the center axis, said first outer subregion having a plane optimized to converge the first light beam transmitting said first outer subregion onto the first optical information recording medium, said first inner subregion having a plane optimized to converge the second light beam transmitting said first inner subregion onto the second optical information recording medium having a larger thickness than the first optical information recording medium;

wherein said optical plate element comprises a second inner subregion and a second outer subregion divided from the second inner subregion with an optical step;

wherein said second inner subregion and said second outer subregion are arranged such that the first light beam transmitting said first outer subregion transmits said second outer subregion while the second light beam transmitting said first inner subregion transmits said second inner subregion;

wherein said inner region comprises said first inner subregion and said second inner subregion, and said outer region comprises said first outer subregion and said second outer subregion.

2. The converging element according to claim 1, wherein said second inner subregion of said optical plate element is made of a dielectric material different from that of said second outer subregion.

3. The converging element according to claim 1, wherein a thickness of said second inner subregion of said optical plate element is different from a thickness of said second outer subregion thereof.

4. The converging element according to claim 3, wherein the thickness of said second inner subregion is constant.

5. The converging element according to claim 3, wherein said second inner subregion has a plane optimized to converge the first and second light beams transmitting therethrough.

6. An optical head comprising:

a first light source for generating a first light beam;

a second light source for generating a second light beam;

a converging element which converges the first light beam onto a first optical information recording medium having a transparent plate thicker than the first optical information recording medium, said converging element having an inner region near a center axis of the first and second light beams and an outer region far from the center axis, said outer region having a plane optimized to converge the first light beam transmitting said outer region onto the first optical information recording medium said inner region having a plane optimized to converge the second light beam transmitting said inner region onto the second optical information recording medium having a larger thickness than the first optical information recording medium, wherein a phase of the light beam transmitting an innermost portion in the plane of said outer region is shifted relative to that of the light beam transmitting an outermost portion in the plane of said inner region, wherein said converging element comprises:

a lens which converges the first light beam onto the first optical information recording medium and the second light beam onto the second optical information recording recording medium; and and an optical plate element to be cooperated with said lens;

wherein said lens comprises an inner region near a center axis of the first and light and second beam and an outer region far from the center axis, said outer region having a plane optimized to converge the first light beam transmitting said outer region onto the first optical information recording medium, said inner region having a plane optimized to converge the second light beam transmitting said inner region onto the second optical information recording medium having a larger thickness than the first optical information recording medium;

wherein said optical plate element comprises an inner portion and an outer portion divided from the inner portion with an optical step, wherein said inner and outer portions are arranged in cooperation with said lens such that the first light beam transmitting said outer region of said lens transmits said outer portion and the second light beam transmitting said inner region of said lens transmits said inner portion.

7. The optical head according to claim 6, wherein the first light beam has a first wavelength, and the second light beam has a second wavelength different than the first wavelength, and wherein said lens has a plane in said outer region optimized to converge the light beam of the first wavelength transmitting said outer region onto the first optical information recording medium and has another plane in said inner region optimized to converge the light beam of second wavelength transmitting said inner region onto the second optical information recording medium having a larger thickness than the first information recording medium when said lens is used along with said optical plate element.

8. The optical head according to claim 6, wherein said optical plate element and said lens are held by a movable member having a driver means which moves in focus and tracking directions for said lens, and wherein said optical plate element and said lens are arranged to keep dynamical balance relative to a center of gravity of said movable member.

9. The optical head according to claim 7, wherein said optical plate element and said lens are held by a movable member having a driver means which moves in focus and tracking directions for said lens, and wherin said optical plate element and said lens are arranged to keep dynamical balance relative to a center of gravity of said movable member.

10. The optical head according to claim 9, wherein said lens has the plane in said inner region optimized to converge the light beam of a second transmitting said inner region onto the second optical information recording medium having a larger thickness than the first information recording medium.

11. An optical information recording and reproducing apparatus comprising:

a first light source which generates a first light beam;

a second light source for generating a second light beam;

a converging element which converges the first light beam from onto a first optical information recording medium having a transparent plate, and converges the second light beam onto a second optical information recording medium having a transparent plate thicker than the first optical information recording medium;

a first photodetector and a second photodetector which receive a light reflected from the first and second optical information recording mediums, respectively, to convert the reflected light to an electric signal; and a signal processor which distinguishes a type of optical information recording medium and reads information selectively from the electric signal;

wherein said converging element comprises an inner region near a center axis of the first and second light beams and an outer region far from the center axis, said outer region having a plane optimized to converge the first light beam transmitting said outer region onto a first optical information recording medium, said inner region having a plane optimized to converge the second light beam transmitting said inner region onto the second optical information recording medium having a larger thickness than the first optical information recording medium, and a phase of the light beam transmitting an innermost portion in the plane of said outer region is shifted relative to that of the light beam transmitting an outermost portion of the plane of said inner region, wherein said converging element comprises:

a lens which converges the first light beam onto a first optical information recording medium and the second light beam onto the second optical information recording medium; and an optical plate element to be cooperated with said lens;

wherein said lens comprises a first inner portion near a center axis of the first and second light beams and a first outer portion far from the center axis, said first outer portion having a plane optimized to converge the first light beam transmitting said first outer portion onto the first optical information recording medium, said first inner portion having a plane optimized to converge the second light beam transmitting said first inner portion onto the second optical information recording medium having a larger thickness than the first optical information recording medium;

wherein said optical plate element comprises a second inner portion and a second outer portion divided from the second inner portion with an optical step, wherein said second inner and outer portions are arranged such that the first light beam transmitting said first outer portion transmits said second outer portion while the second light beam transmitting said first inner portion transmits said second inner portion when said optical plate element is cooperated with said lens.

12. The apparatus according to claim 11, wherein said optical plate element and said lens are held by a movable member having a driver means which moves in focus and tracking directions for said lens, and wherein said optical plate element and said lens are arranged to keep dynamical balance relative to a center of gravity of said movable member.

13. The apparatus according to claim 11, wherein when the first light beam is converged onto the first optical information recording medium, a wave-front aberration satisfies the condition that a total amount of aberration $\geq 20$ m$\lambda$ (rms), and a fifth spherical aberration $\leq 20$ m$\lambda$ (rms).

14. The apparatus according to claim 13, wherein when the first light beam is converged onto the first optical information recording medium, a wave-front aberration satisfies that the condition that a seventh spherical aberration $\leq 30$ m$\lambda$ (rms).

15. The apparatus according to claim 11, wherein a numerical aperture, NA, of the plane of said inner region and a NA of the entire lens have a following relationship that 0.7*NA of the entire lens$\leq$NA of said inner region $\leq$0.8*NA of the entire lens, and a phase shift of the light beam transmitting the innermost portion of the plane of said outer region to that of the light beam transmitting the outermost portion of the plane of said inner region has a value between 50 and 150 degrees.

16. The apparatus according to claim 11, wherein said converging element is optimized to converge the light beam onto an information recording medium having a thickness of the inner region equal to or smaller than t1*0.6 wherein t1 denotes thickness of a plane of the second information recording medium.

17. The apparatus according to claim 11, wherein said first and second photodetectors are provided for the first and second optical recording information medium of different thicknesses.

18. A converging element which converges a first light beam from a first light source used for recording and/or reproduction for a first optical information recording medium having a first transparent plate, and converges a second light beam from a second light source used for recording and/or reproduction for a second optical information recording medium having a second transparent plate thicker than the first optical information recording medium, the converging element comprising:

a lens which converges the first light beam onto the first optical information medium and converges the second light beam onto the second optical information medium; and an optical plate element to be combined with said lens;

wherein said lens comorises a first inner region near a center axis of the first and second light beams and a first outer region far from the center axis and adjacent to said first inner region;

wherein said optical plate element comprises a second inner region and a second outer region separated from each other by an optical step;

wherein when the first light beam enters the second inner region and the second outer region of said optical plate element and the first inner region and the first outer region of said lens to be focused onto a recording layer formed on the first transparent plate of the first information recording medium, the first beam is converged on the recording layer such that spherical aberration of the first light beam transmitting the first outer region becomes minimum for the thickness of the first optical information recording medium; and wherein when the second light beam enters the second inner region of said optical plate element and the first inner region of said lens to be focused onto a recording layer formed on said second transparent plate, the second beam is converged on the recording layer such that spherical aberration of the second light beam transmitting the first and second inner regions becomes minimum for a transparent plate having a thickness between the thickness of the first optical information recording medium and the thickness of the second optical information recording medium.

19. The converging element according to claim 18, wherein a thickness of said optical plate element is different between the second inner region and the second outer region.

20. The converging element according to claim 18, wherein the second inner region and the second outer region of said optical plate element are made of dielectric materials different from each other.

21. An optical head comprising:

a first light source which generates a first light beam used for recording and/or reproduction for a first optical information recording medium having a first transparent plate;

a second light source which generates a second light beam used for recording and/ or reproduction for a second optical information recording medium having a second transparent plate thicker than the first optical information recording medium; and a converging element which converges the first light beam from said first light source ont othe first optical information recording medium and converges the second light beam from said second light source onto the second optical information recording medium;

said converging element comprising:

a lens which converges the first light beam onto the first optical information medium and converges the second light beam ont othe second optical information medium; and an optical plate element to be combined with said lens;

wherein said lens comprises a first inner region near a center axis of the first and second light beams and a first outer region far from the center axis and adjacent to said first inner region;

wherein said optical plate element comprises a second inner region and a second outer region separated from each other by an optical step;

wherein when the first light beam enters the second inner region and the second outer region of said optical plate element and the first inner region and the first outer region of said lens to be focused onto a recording layer formed on the first transparent plate of the first information recording medium, the first beam is converged on the recording layer such that spherical aberration of the first light beam tranmitting the first outer region becomes minimum for the thickness of the first optical information recording medium; and wherein when the second light beam enters the second inner region of said optical plate element and the first inner region of said lens to be focused onto a recording layer formed on said second transparent plate, the second beam is converged on the recording layer such that spherical aberration of the second light beam transmitting the first and second inner regions becomes minimum for a transparent plate having a thickness between the thickness of the first optical information recording medium and the thickness of the second optical information recording medium.

22. The optical head according to claim 21, wherein a thickness of said optical plate element is different between the second inner region and the second outer region.

23. The optical head according to claim 21, wherein the second inner region and the second outer region of said optical plate element are made of dielectric materials different from each other.

24. An optical information recording and reproducing aparatus comprising:

a first light source which generates a first light beam used for recording and/or reproduction for a first optical information recording medium having a first transparent plate;

a second light source which generates a second light beam used for recording and/or reproduction for a second optical information recording medium having a second transparent plate thicker than the first optical information recording medium;

a converging element which converges the first light beam from said the first light source onto the first optical information recording medium and converges the second light beam from said second light source onto the second optical information recording medium;

a first photodetector and a second photodetector which receive light reflected from the first and second optical information recording mediums, respectively, to convert the reflected light to an electric signal; and a signal processor which distinguishes a type of optical information recording medium and reads information selectively from the electric signal;

said converging element comprising:

a lens which converges the first light beam onto the first optical information medium and converges the second light beam onto the second optical information medium; and an optical plate element to be combined with said lens;

wherein said lens comprises a first inner region near a center axis of the first and second light beams and a first outer region far from the center axis and adjacent to said first inner region;

wherein said optical plate element comprises a second inner region and a second outer region separated from each other by an optical step;

wherein when the first lgiht beam enters the second inner region and the second outer region of said optical plate element and the first inner region and the first outer region of said lens to be focused onto a recording layer formed on the first transparent plate of the first information recording medium, the first beam is converged on the recording layer such that spherical aberration of the first light beam transmitting the first outer region becomes minimum for the thickness of the first optical information recording medium; and wherein when the second light beam enters the second inner region of said optical plate element and the first inner region of said lens to be focused onto a recording layer formed on said second transparent plate, the second beam is converged on the recording layer such that spherical aberration of the second light beam transmitting the first and second inner regions becomes minimum for a transparent plate having a thickness between the thickness of the first optical information recording medium and the thickness of the second optical information recording medium.

25. The optical information recording and reproducing apparatus according to claim 24, wherein said optical plate element has a thickness different between the second inner region and the second outer region.

26. The optical information recording and reproducing apparatus according to claim 24, wherein the second inner region and the second outer region of said optical plate element are made of dielectric materials different from each other.

* * * * *

UNITED STATES PATENT AND TRADEMARK OFFICE
CERTIFICATE OF CORRECTION

PATENT NO.    : 6,920,102 B2
DATED         : July 19, 2005
INVENTOR(S)   : Sadao Mizuno et al.

It is certified that error appears in the above-identified patent and that said Letters Patent is hereby corrected as shown below:

Column 33,
Line 14, add -- and converges the second light beam onto a second optical information recording medium having a transparent plate -- between "plate" and "thicker".
Line 17, add a comma between "medium" and "said".
Line 31, delete "and".
Line 34, replace "first and light and second beam" with -- first and second light beams --.
Line 62, replace "of second" with -- of the second --.

Column 34,
Line 12, replace "wherin" with -- wherein --.
Line 32, replace "receive a light" with -- receive light --.

Column 35,
Line 49, replace "medium" with -- mediums --.
Line 65, replace "comorises" with -- comprises --.

Column 36,
Lines 46 and 53, replace "ont othe" with -- onto the --.

Column 37,
Line 38, replace "said the first" with -- said first --.

Column 38,
Line 14, replace "lgiht" with -- light --.

Signed and Sealed this

Seventh Day of February, 2006

JON W. DUDAS
*Director of the United States Patent and Trademark Office*